(12) United States Patent
Zhu et al.

(10) Patent No.: US 12,489,291 B2
(45) Date of Patent: Dec. 2, 2025

(54) JUMPER CABLE DEVICE AND JUMP START SYSTEM

(71) Applicant: Shenzhen Caross Co., Ltd, Shenzhen (CN)

(72) Inventors: Chunyi Zhu, Hunan (CN); Leibo Zhuang, Shenzhen (CN)

(73) Assignee: Shenzhen Caross Co., Ltd, Shenzhen (CN)

( * ) Notice: Subject to any disclaimer, the term of this patent is extended or adjusted under 35 U.S.C. 154(b) by 34 days.

(21) Appl. No.: 18/412,643

(22) Filed: Jan. 15, 2024

(65) Prior Publication Data
US 2024/0154411 A1 May 9, 2024

Related U.S. Application Data

(60) Continuation-in-part of application No. 17/705,377, filed on Mar. 27, 2022, now Pat. No. 11,876,370, (Continued)

(51) Int. Cl.
*H02J 1/10* (2006.01)
*B60R 16/02* (2006.01)
(Continued)

(52) U.S. Cl.
CPC .............. *H02J 1/122* (2020.01); *B60R 16/02* (2013.01); *H01R 11/24* (2013.01); *H02J 7/0029* (2013.01)

(58) Field of Classification Search
CPC ......... H02J 1/122; H02J 7/0029; B60R 16/02; H01R 11/24
(Continued)

(56) References Cited

U.S. PATENT DOCUMENTS

| 4,349,774 A | 9/1982 | Farque |
| 4,400,658 A | 8/1983 | Yates |

(Continued)

FOREIGN PATENT DOCUMENTS

| AU | 2003231619 A1 | 2/2004 |
| CN | 2852492 Y | 12/2006 |

(Continued)

OTHER PUBLICATIONS

Office Action dated Sep. 30, 2024 for Corresponding Australian Application No. 2022306442.

(Continued)

*Primary Examiner* — Hal Kaplan

(57) ABSTRACT

A jumper cable device includes an input to be connected with an startup power source, two clamps to be connected to a battery of a load, a main controller, a clamp polarity detection module, a forced mode feedback module and a clamp connection module; the main controller is connected to the clamp polarity detection module and the clamp connection module, the clamp polarity detection module and the clamp connection module are further connected to the two clamps, and the forced mode feedback module is connected to the main controller and the two clamps; wherein when a voltage of the battery of the load is lower than a detection threshold, the forced mode feedback module is operated to forcibly connect the circuits between the input and the two clamps, thereby switching on the circuit to the battery.

20 Claims, 13 Drawing Sheets

Related U.S. Application Data which is a division of application No. 17/395,500, filed on Aug. 6, 2021, now Pat. No. 11,303,122.

(51) Int. Cl.
*H01R 11/24* (2006.01)
*H02J 7/00* (2006.01)

(58) Field of Classification Search
USPC .......................................................... 320/105
See application file for complete search history.

(56) References Cited

U.S. PATENT DOCUMENTS

| | | |
|---|---|---|
| 4,488,147 A | 12/1984 | Signorile |
| 4,871,957 A | 10/1989 | Taranto et al. |
| 4,938,712 A * | 7/1990 | Black ..................... H01R 11/24 |
| | | 320/DIG. 15 |
| 5,795,182 A | 8/1998 | Jacob |
| 6,262,492 B1 | 7/2001 | Sheng |
| 9,770,992 B2 | 9/2017 | Nook et al. |
| 10,826,286 B2 | 11/2020 | Guo et al. |
| 2005/0116688 A1 | 6/2005 | Yin et al. |
| 2017/0054290 A1 | 2/2017 | Di et al. |
| 2019/0229544 A1 | 7/2019 | Inskeep et al. |
| 2021/0135466 A1 | 5/2021 | Rumbaugh |

FOREIGN PATENT DOCUMENTS

| | | |
|---|---|---|
| CN | 102364813 A | 2/2012 |
| CN | 102545350 A | 7/2012 |
| CN | 102570533 A | 7/2012 |
| CN | 110108976 A | 8/2019 |
| CN | 111226371 A | 6/2020 |
| CN | 111878278 A | 11/2020 |
| CN | 212063595 U | 12/2020 |
| JP | 2010133151 A | 6/2010 |
| JP | 2020039200 A | 3/2020 |
| RU | 18023 U1 | 5/2001 |
| WO | WO 0010226 A1 | 2/2000 |
| WO | 2019/190588 A1 | 10/2019 |

OTHER PUBLICATIONS

Office Action dated Mar. 8, 2022 for corresponding Chinese Application No. 202110763308.1.
Office Action dated Mar. 1, 2022 for corresponding Chinese Application No. 202110763309.6.
Office Action dated Aug. 3, 2022 for corresponding Chinese Application No. 202110763309.6.
Office Action Dated Jun. 20, 2024 for Corresponding Russian Application No. 2024102642.
Office Action Dated Feb. 26, 2025 for Corresponding Canadian Patent Application No. 3,225,106.
Office Action Dated Mar. 5, 2025 for Corresponding European Patent Application No. 21191167.2.

* cited by examiner

JUMPER CABLE DEVICE AND JUMP START SYSTEM

CROSS-REFERENCE TO RELATED APPLICATIONS

The present application is a continuation-in-part application of U.S. patent application Ser. No. 17/705,377, which is a divisional application of U.S. patent application Ser. No. 17/395,500, filed on Aug. 6, 2021, now patent Ser. No. 11/303,122, which claims priority of Chinese patent Application No. 202110763309.6 filed on Jul. 6, 2021 and Chinese patent Application No. 202110763308.1 filed on Jul. 6, 2021. The entire contents of the above applications are hereby incorporated by reference.

TECHNICAL FIELD

The present invention relates to the technical field of electronics, and particularly to a jumper cable device and a jump start system.

BACKGROUND

Vehicles adopt an ignition system controlled by a microprocessor. The displacement of vehicles is different, so the current, voltage and power required for ignition and startup are also different, so do the under-voltage and damage degree of the batteries on vehicles. Therefore, jumper cables with different functions are produced, such as MOS (Metal-Oxide-Semiconductor Field-Effect Transistor, MOSFET) tube-controlled type, power-diode type, straight-through type, and other types.

However, the jumper cables of the aforesaid types have their own technical defects. For the MOS tube-controlled jumper cables, a plurality of technical defects may appear. For example, it is difficult to enable the vehicles to start with a large displacement and it is prone to burn the MOS tube due to overheating; fail to detect the completion of ignition action even after a successful ignition, the ignition circuit cannot be disconnected and fail to enable the ignition function after a damage of the battery. For the jumper cables controlled by power diode, it is also difficult to start the vehicles with a large displacement, prone to burn the diode due to over temperature and no protection for short circuit; unable to detect the completion of ignition action even after a successful ignition and the ignition circuit cannot be disconnected. For straight-through jumper cables, no reverse connection protection is provided. It will fail to boost the vehicle battery when polarities of the jumper cable are reversely connected to electrodes of the vehicle battery, what is worse, a serious risk may raise due to the reverse connection, for example, a fire may be caused by short circuit.

SUMMARY

The present disclosure provides a jumper cable device and a jump start system, aiming to solve one or more of the above technical problems.

Embodiments of the present disclosure provide a jumper cable device comprising an input and two clamps, wherein the input is configured to be connected with a startup power source, and the two clamps are configured to be connected to a battery of a load; wherein the jumper cable device further comprises a main controller, a clamp polarity detection module, a forced mode feedback module and a clamp connection module; wherein the main controller is connected to the clamp polarity detection module and the clamp connection module, the clamp polarity detection module and the clamp connection module are further connected to the two clamps, and the forced mode feedback module is connected to the main controller and the two clamps; and when the two clamps are connected to the battery, the clamp polarity detection module is configured to detect polarities of electrodes of the battery to which the two clamps are respectively connected, and the main controller is configured to acquire a detection result signal of the clamp polarity detection module, control the clamp connection module according to the detection result signal to determine polarities of the two clamps according to the polarities of the electrodes of the battery and connect circuits between the input and the two clamps to switch on a circuit to the battery; wherein when a voltage of the battery of the load is lower than a detection threshold, the forced mode feedback module is operated to forcibly connect the circuits between the input and the two clamps, thereby switching on the circuit to the battery.

Embodiments of the present disclosure further provide a jump start system, which includes a startup power source and the jumper cable device described above.

In the jumper cable device according to the embodiments of the present disclosure, there is no need to confirm in advance whether the clamps have been connected to the electrodes of the battery with correct polarities. In addition, as the clamps can be connected with the battery without particular polarity requirement, the risk caused by reverse connection is avoided, the reliability of the jumper cable device is improved, and the service life of the jumper cable device is prolonged. Even if the voltage of the battery of the connected load is insufficient, the two clamps can still be randomly connected to two electrodes of the load battery, and the forced mode feedback function could be used to forcibly connect the path between the power input and the two clamps, thereby switching on the circuit to the battery.

BRIEF DESCRIPTION OF DRAWINGS

In order to illustrate the technical solutions of the embodiments according to the present application more clearly, drawings used in the description of the embodiments according to the present application will be briefly introduced below. It should be appreciated that the drawings described below merely illustrate some embodiments of the present application, and other drawings may be obtained by those skilled in the art without departing from the scope of the drawings.

DESCRIPTION OF EMBODIMENTS

In order to make the inventive objects, features, and advantages of the present disclosure more apparent and understandable, technical solutions in the embodiments of the present disclosure will be described clearly and completely in conjunction with accompanying drawings in the embodiments of the present disclosure. Evidently, the described embodiments are only a part of the embodiments of the present disclosure, but not all the embodiments of the present disclosure. Based on the embodiments of the present disclosure, all other embodiments obtained by those skilled in the art without creative efforts shall fall within a protection scope of the present disclosure.

Figure 1:
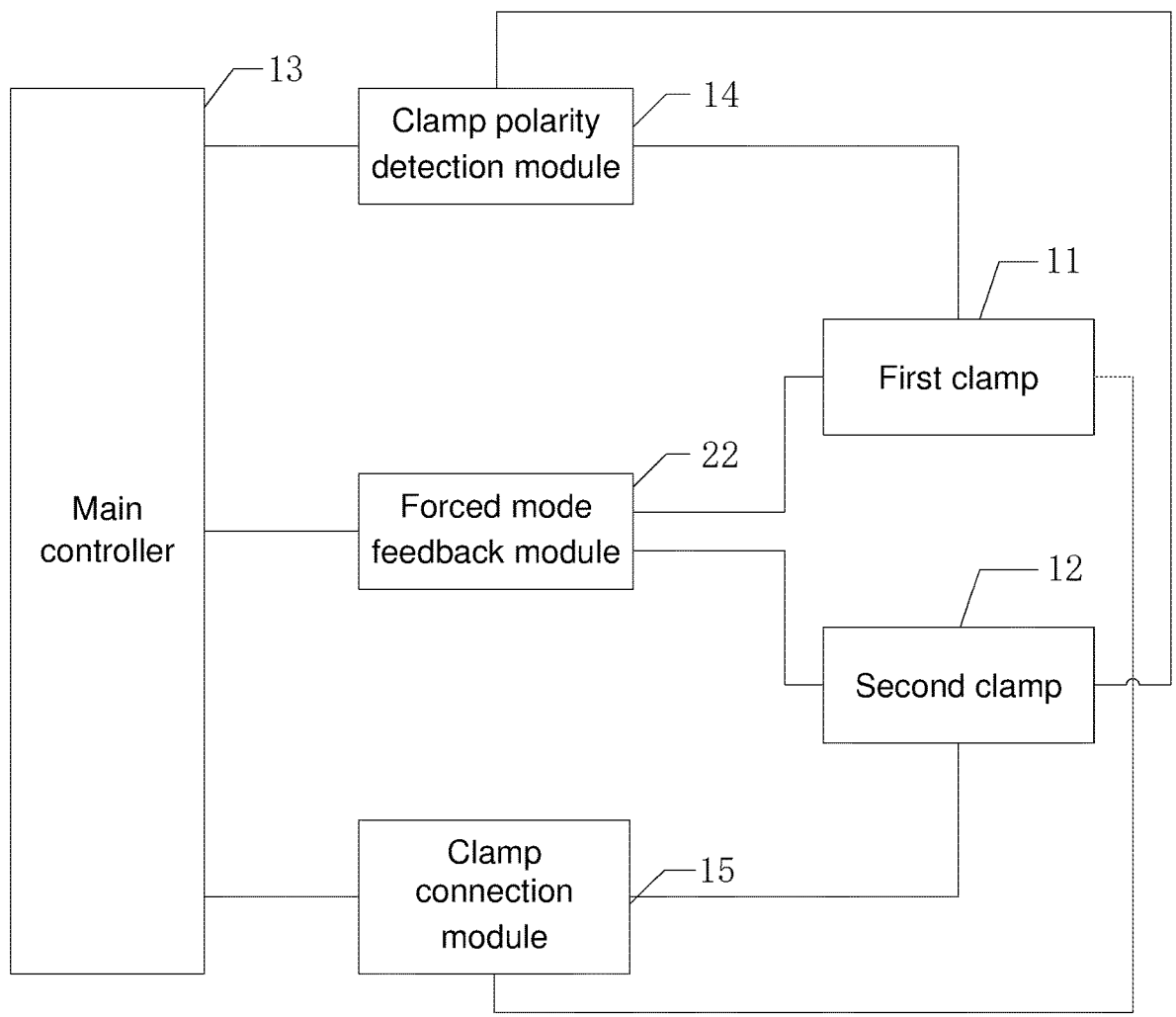
FIG. 1 is a block diagram showing a jumper cable device according to an embodiment of the present disclosure.

Referring to FIG. 1, a jumper cable device according to an embodiment of the present disclosure is shown. The jumper cable device may be used for electronic systems such as vehicles and yachts that require ignition to start. The jumper cable device is configured to connect an startup power source (for example, a portable power source such as a portable battery) to a battery of a load such as the vehicle, the yacht and the like to provide an instantaneous large current to the load battery, in order to allow the load battery to startup its engine. The jumper cable device will be described in detail below as an example in combination with the ignition of the vehicles. The jumper cable device includes two clamps, i.e., a first clamp 11 and a second clamp 12. The two clamps 11 and 12 are configured to be connected to a battery of a load, e.g., a vehicle. The jumper cable device further includes an input (not shown), which is configured to connect with an output port of the startup power source in an insertable manner to receive power therefrom. The jumper cable device further includes a main controller 13, a clamp polarity detection module 14, a clamp connection module 15, and a forced mode feedback module 22.

Particularly, the main controller 13 includes a main control chip and peripheral circuits. The main control chip is particularly a microcontroller unit (MCU) with a specific model of HT66F3195, for example, and having 28 pins.

The main controller 13 is connected to the clamp polarity detection module 14 and the clamp connection module 15. The clamp polarity detection module 14 and the clamp connection module 15 are further connected to the first clamp 11 and the second clamp 12. The forced mode feedback module 22 is connected to the main controller 13 and the two clamps 11, 12.

The load (e.g., vehicle) battery has two electrodes, i.e., a positive electrode and a negative electrode. After the jumper cable device has been connected in circuit with the startup power source and the vehicle battery, one of the first clamp 11 and the second clamp 12 is a positive clamp and the other one is a negative clamp. However, before that connection, the first and second clamps 11, 12 are of no polarity. Therefore, when connecting the two clamps according to the embodiment of the present disclosure to the battery, there is no need to identify the polarities of the electrodes of the vehicle battery. That is, for either clamp, there is no predetermined polarity for it before it is connected to the vehicle battery. Accordingly, the clamp may be connected to the positive electrode of the battery, or it may be connected to the negative electrode of the battery. In other words, it is possible that the first clamp 11 is connected to the positive electrode of the battery, and the second clamp 12 is connected to the negative electrode of the battery to switch on. It is also possible that the first clamp 11 is connected to the negative electrode of the battery, and the second clamp 12 is connected to the positive electrode of the battery to switch on. When the two clamps are connected to two electrodes of the battery, the clamp polarity detection module 14 is configured to detect the polarities of the electrodes of the battery to which the two clamps are respectively connected. That is, it is configured to determine whether each clamp is connected to the positive electrode or the negative electrode of the battery. The main controller 13 is configured to acquire a detection result signal of the clamp polarity detection module 14, and preferably, the detection result signal may be a level signal. Preferably, the detection result signal is a low-level signal.

In the present embodiment, if the voltage of the load battery is lower than a detection threshold (such as 2V), for example, the voltage of the load battery has dropped to 0V, then the battery voltage is no longer sufficient for the clamp polarity detection module 14 to detect the respective polarities of the two electrodes of the battery that each clamp is connected to. However, the forced mode feedback module 22 can be configured to forcibly connect the path (e.g., circuits) between the power input and the two clamps, thereby switching on a circuit to the battery of the load to provide instantaneous large current to the battery of the load.

Preferably, when the two clamps 11 and 12 are connected to the battery of the load and the voltage of the battery of the load is lower than the detection threshold, the path (e.g., circuits) between the power input and the two clamps can be forcibly connected by pressing the forced switch on the clamp which is connected to the positive electrode of the battery of the load, thereby switching on the circuit to the battery. Therefore, the jumper cable device in the embodiment of the present application can obtain the polarity of the two electrodes of the connected battery based on the forced mode feedback signal on the clamp connected to the positive electrode of the load's battery, and automatically connect the power input and the two clamps according to the obtained feedback signal. There is no need to confirm whether the clamps are connected to the electrodes of the battery with correct polarities, simplifying the connection and improving the reliability of the jumper cable device.

Figure 2:
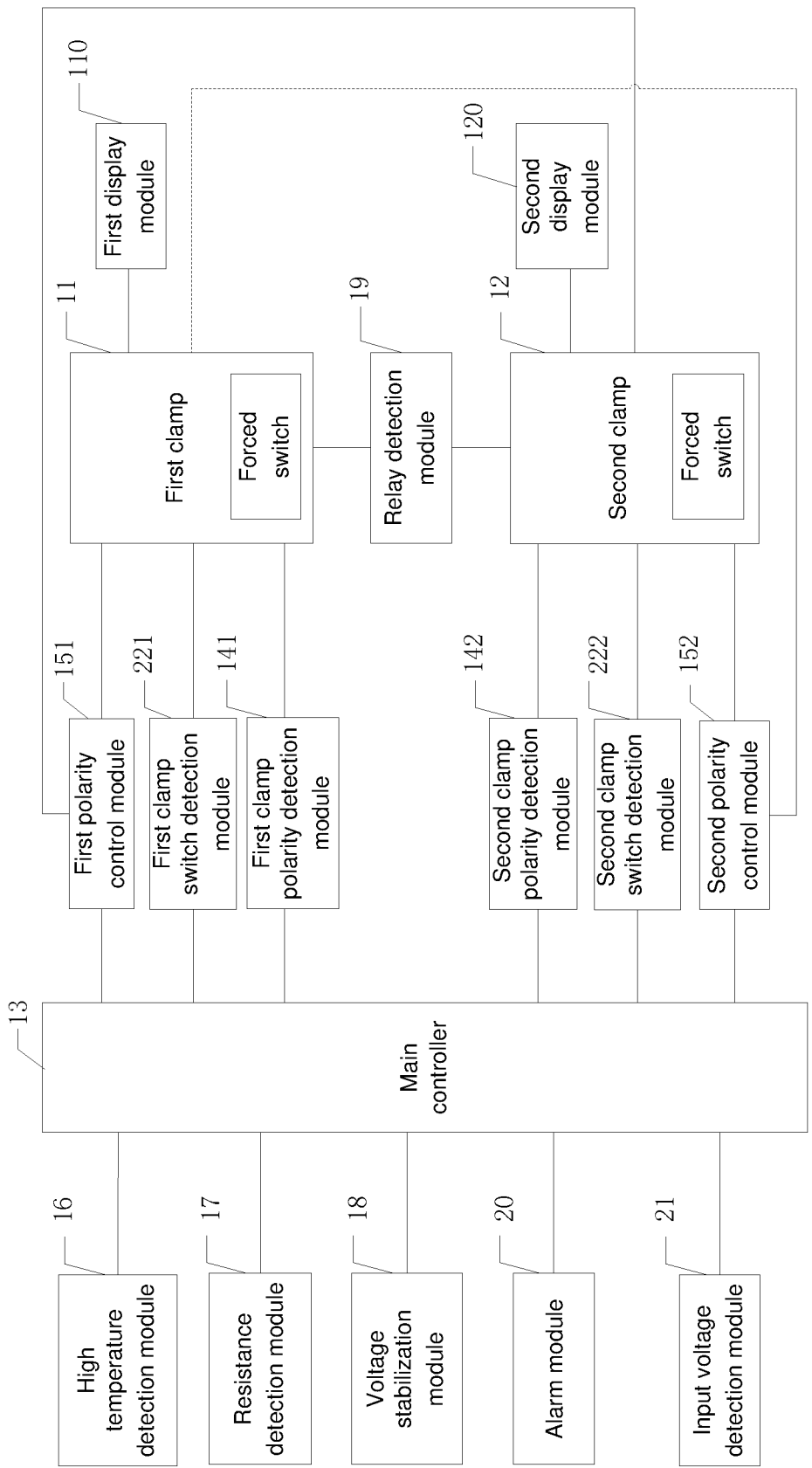
FIG. 2 is a block diagram showing a jumper cable device according to another embodiment of the present disclosure.

Referring to FIG. 2, a jumper cable device according to another embodiment of the present disclosure is shown. Compared with the first embodiment, the clamp polarity detection module 14 of the embodiment particularly includes a first clamp polarity detection module 141 and a second clamp polarity detection module 142. The first clamp polarity detection module 141 and the second clamp polarity detection module 142 are connected to the first clamp 11 and the second clamp 12 respectively, and connected to different pins of the main controller 13 respectively. When the two clamps are connected to the load battery, it is determined that the first clamp 11 is connected to the positive electrode of the battery when a pin of the main controller 13 which is connected to the first clamp polarity detection module 141 detects that a high-level signal is changed to a low-level signal; and vice versa, when a pin of the main controller 13 which is connected to the second clamp polarity detection module 142 detects that the high-level signal is changed to the low-level signal, it is determined that the second clamp 12 is connected to the positive electrode of the battery.

Further, the main controller 13 controls the clamp connection module 15 to determine the expected polarities of the two clamps according to the detected polarities of the electrodes of the vehicle battery to which the two clamps are connected, and connecting each clamp to the respective electrode of the same polarity. That is, the clamp connected to the positive electrode of the battery is determined as the positive clamp, and the clamp connected to the negative electrode of the battery is determined as the negative clamp. Then the circuits between the clamps 11, 12 and electrodes of the startup power source are respectively connected to switch on to enable the ignition. Accordingly, since the polarities of the clamps in the embodiment of the present disclosure are automatically determined according to the polarities of the electrodes of the battery to which the two clamps are connected, there is no need to confirm whether the clamps have been connected to the electrodes of the battery with correct polarities, and connection in any case would not affect the ignition of the vehicle, simplifying the connection and improving the reliability of the jumper cable device.

In the embodiments of the present disclosure, the jumper cable device includes the input, the two clamps, the main controller, the clamp polarity detection module, the clamp connection module, and the forced mode feedback module. The main controller is connected to the clamp polarity detection module and the clamp connection module; the clamp polarity detection module and the clamp connection module are further connected to the two clamps; the forced mode feedback module is connected to the main controller and the two clamps. When the two clamps are connected to the battery and the voltage of the battery is not lower than the detection threshold (e.g., 2V), the clamp polarity detection module is configured to detect the polarities of the electrodes of the battery to which the two clamps are respectively connected. The main controller is configured to acquire a detection result signal of the clamp polarity detection module, control the clamp connection module based on the detection result signal to determine the polarities of the two clamps according to the polarities of the electrodes of the battery, and to connect circuits from the startup power source to the two clamps and thus the battery. Since the polarities of the two clamps are automatically determined according to the polarities of the electrodes of the battery, there is no need to confirm in advance whether the clamps have been connected to the electrodes of the battery with correct polarities. By means of the above jumper cable device, the electrical connection between the two clamps and the battery can be achieved according to the polarities of the electrodes of the battery, to achieve normal ignition operation, and increase the success rate of the ignition. In addition, as the clamps can be connected with the battery without particular polarity requirement, the risk caused by reverse connection is avoided, the reliability of the jumper cable device is improved, and the service life of the jumper cable device is prolonged. When the voltage of the battery of the connected load is lower than the detection threshold, the forced mode feedback module is activated and operated to forcibly connect the path between the power input and the two clamps, thereby switching on the circuit to the battery.

In this embodiment, when the load battery has no power at all, or its voltage is very low (for example, lower than a detection threshold) which is insufficient to generate a detection signal, and the two clamps of the jumper cable device are connected to the positive and negative electrodes of the load battery, because there is no detection signal generated, the main controller cannot determine the positive and negative polarities of the two clamps based on the detection of the clamp polarity detection module, and thus cannot connect the path to the clamps. Therefore, the jumper cable device needs to be forcibly connected in order to work normally. The forced mode means that when two clamps are randomly clamped to the first electrode and the second electrode of the load battery regardless of the positive and negative polarities, by pressing the forced switch on the clamp which is connected to the specified polarity (e.g., positive electrode) of the load battery, the forced working mode function will be enabled. The clamp which is connected to the specified polarity (e.g., positive electrode) of the load battery will be connected to the same polarity (e.g., positive electrode), and the other clamp will be connected to the opposite polarity (e.g., negative electrode), thereby allowing the jumper cable device to connect the path (e.g., circuits) between the load battery and the output of the startup power source. The output of the startup power source is connected to the input of the jumper cable device.

Figure 15:
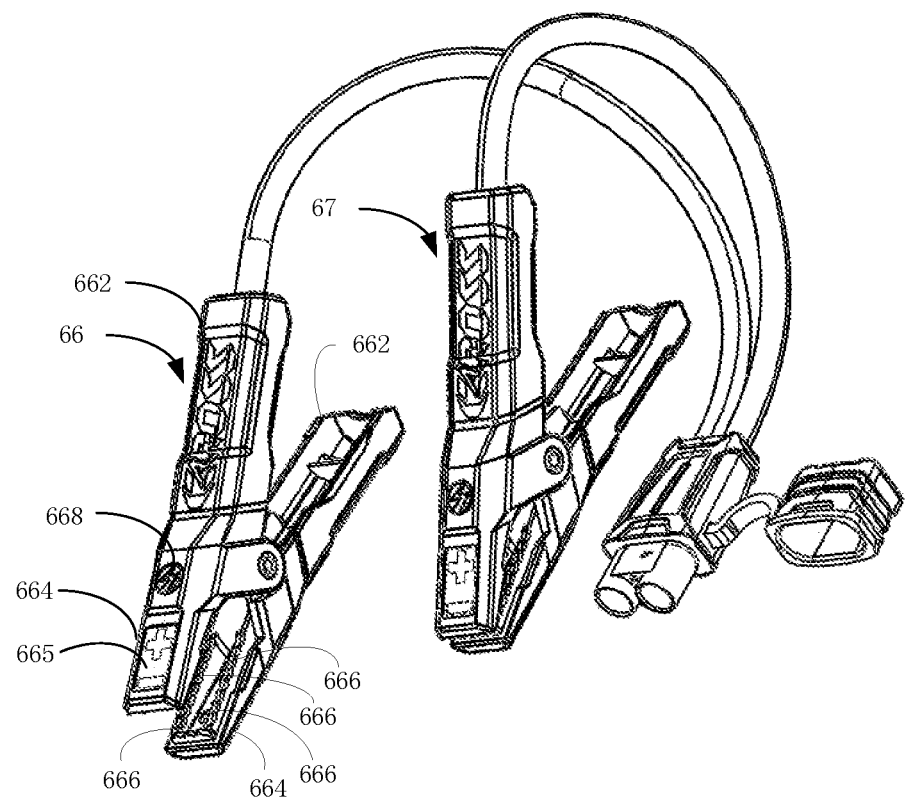
FIG. 15 is a perspective view showing the clamp part of the jump start system shown in FIG. 14.

Specifically, the forced mode feedback module may include two forced switches and a switch detection module. The two forced switches are respectively provided on two clamps. As shown in FIG. 15, each clamp has a forced switch 668. The switch detection module is connected to the two forced switches and the main controller 13. When the two clamps are connected to the battery of the load and the voltage of the battery of the load is lower than the detection threshold, the path (e.g., circuits) between the power input and the two clamps can be forcibly connected by pressing the forced switch on the clamp which is connected to the specified polarity (e.g., positive electrode) of the battery of the load, thereby switching on the circuit to the battery. At this time, the clamp which is connected to the specified polarity (e.g., positive electrode) of the load battery will be connected to the same polarity (e.g., positive electrode). It should be noted that the two clamps could be randomly clamped to the electrodes of the load battery, regardless of the positive and negative polarities of the two clamps. The switch detection module is configured to detect which clamp's forced switch has been pressed. The main controller is configured to obtain the feedback signal from the switch detection module, and obtain the respective polarities of the electrodes of the battery to which the two clamps are connected based on the feedback signal. The polarities of the two clamps are determined according to the respective polarities of the electrodes of the battery, and the clamp connection module is controlled to connect the path (e.g., circuits) between the power input and the two clamps, in order to switch on the circuit to the battery.

Referring to FIG. 2, the switch detection module comprises a first clamp switch detection module 221 and a second clamp switch detection module 222. The first clamp switch detection module 221 and the second clamp switch detection module 222 are both connected to the main controller 13, and are connected respectively to the first clamp 11 and the second clamp 12. The first clamp switch detection module 221 is configured to generate a first feedback signal to the main controller 13 in response to detecting that the forced switch on the first clamp 11 has been pressed, and the second clamp switch detection module 222 is configured to generate a second feedback signal to the main controller 13 in response to detecting the forced switch on the second clamp 12 has been pressed. The main controller 13 is further configured to determine that the first clamp 11 is connected to the first electrode of the battery and the second clamp 12 is connected to the second electrode of the battery according to the first feedback signal; or to determine that the second clamp 12 is connected to the first electrode of the battery and the first clamp 11 is connected to the second electrode of the battery according to the second feedback signal. Therefore, the jumper cable device in the embodiment of the present application can obtain the polarities of the electrodes of the connected battery based on the forced mode feedback signal on the clamp, and automatically connect the path (e.g., circuits) between the power input and the two clamps without a need to confirm whether the clamps have been connected to the electrodes of the battery with correct polarities. Even if the voltage of the battery is insufficient to allow the clamp polarity detection module to detect the polarity of the two clamps, it will not affect the starting of the vehicle.

Figure 10:
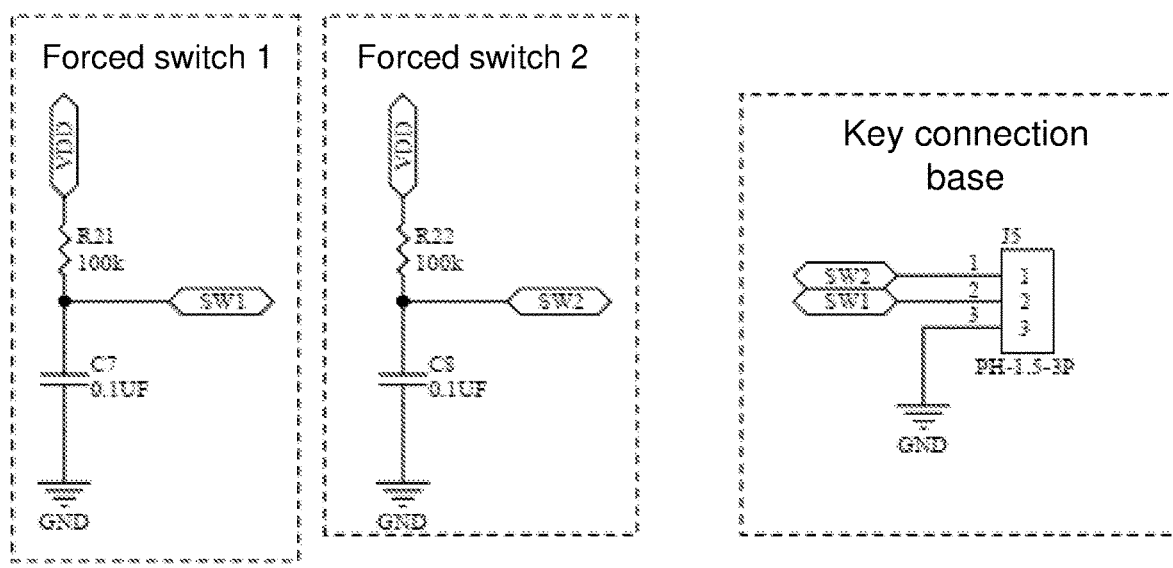
FIG. 10 is a schematic diagram showing a structure and a circuit configuration of the forced mode feedback module of a jumper cable device according to an embodiment of the present invention.

Refer to FIG. 10, which is a schematic diagram of the circuit structure and circuit configuration of a forced mode feedback module of a jumper cable device according to an embodiment of the present disclosure. SW1 is the forced switch detection signal of the first clamp 11. A key connection base J5 is electrically connected to the forced switch of the clamp key board K1 shown in FIG. 7 to obtain the forced switch detection signal SW1. When the forced switch K1 is pressed, the SW1 signal is pulled down to a low level. At this time, it can be determined that the first clamp 11 is connected to the positive electrode and the second clamp 12 is connected to the negative electrode, and their positive and negative polarities are displayed respectively on the display screens of the two clamps. SW2 is the forced switch detection signal of the second clamp 12. The key connection base J5 is electrically connected to the forced switch of the clamp key board K2 shown in FIG. 7 to obtain the forced switch detection signal SW2. When the forced switch K2 is pressed, the SW2 signal is pulled down to a low level. At this time, it can be determined that the second clamp 12 is connected to the positive electrode and the first clamp 11 is connected to the negative electrode, and their positive and negative polarities are displayed respectively on the display screens of the two clamps. Please refer to the descriptions related to FIG. 7 for the detailed circuit and principle.

Still referring to FIG. 2, the jumper cable device further includes a high temperature detection module 16, a resistance detection module 17, a voltage stabilization module 18, an alarm module 20, and an input voltage detection module 21. The voltage stabilization module 18 is connected to the main controller 13. The voltage stabilization module 18 is configured to perform voltage stabilization on the rectified power supply and transmit the resulted power supply to the main controller 13, thereby supplying power to the main controller 13. Please refer to FIG. 6 for the circuit diagram.

In addition, the clamp connection module 15 includes a plurality of switch control modules and a plurality of switches. In this embodiment, the switches are relay switches, and the switch control modules are relay control modules. In other embodiments, the switches may be MOSs or the like, and the switch control modules are MOS control modules or the like.

The clamp connection module 15 includes a first electrode control module 151 and a second electrode control module 152. The first electrode control module 151 and the second electrode control module 152 are respectively connected to different pins of the main controller 13 in a one-to-one manner, and respectively connected to the first electrode and second electrode of the input of the jumper cable device in a one-to-one manner, and are both connected to the first and second clamps 11, 12. The input can be connected to a startup power source. The input of the jumper cable device connected to the startup power source may include a first electrode and a second electrode. In the circuit diagram of FIG. 5, the first electrode of the input is connected to the positive polarity of the startup power source, and the second electrode of the input is connected to the negative polarity of the startup power source. Therefore, the first electrode control module 151 may be the positive electrode control module connected to the positive polarity of the startup power source in FIG. 5. The second electrode control module 152 may be the negative electrode control module connected to the negative polarity of the startup power source in FIG. 5. It can be understood that in other embodiments, the first electrode of the startup power source may be of negative polarity, and the second electrode of the startup power source may be of positive polarity.

The main controller 13 is configured to control switching-on or switching-off of the first polarity control module 151 and the second polarity control module 152 according to the polarities of the electrodes of the startup power source and the polarities of the electrodes of the battery to which the two clamps are respectively connected which are detected by the clamp polarity detection module 14, so as to connect corresponding circuits between the startup power source and the battery according to the principle of connecting the positive polarity to the positive polarity and the negative polarity to the negative polarity. That is, the polarities of the two clamps are determined according to the polarities of the electrodes of the battery. Circuits between the two electrode terminals of the startup power source and the two clamps (and thus the battery) are connected in such a manner that the positive electrode terminal of the startup power source is connected to the positive clamp, and the negative electrode terminal of the startup power source is connected to the negative clamp. In another embodiment, as mentioned above, if the voltage of the battery of the load is lower than the detection threshold, the forced mode feedback module is configured to be operated to forcibly connect the path (e.g., circuits) between the input and the two clamps, thereby switching on the circuit to the battery.

Figure 5:
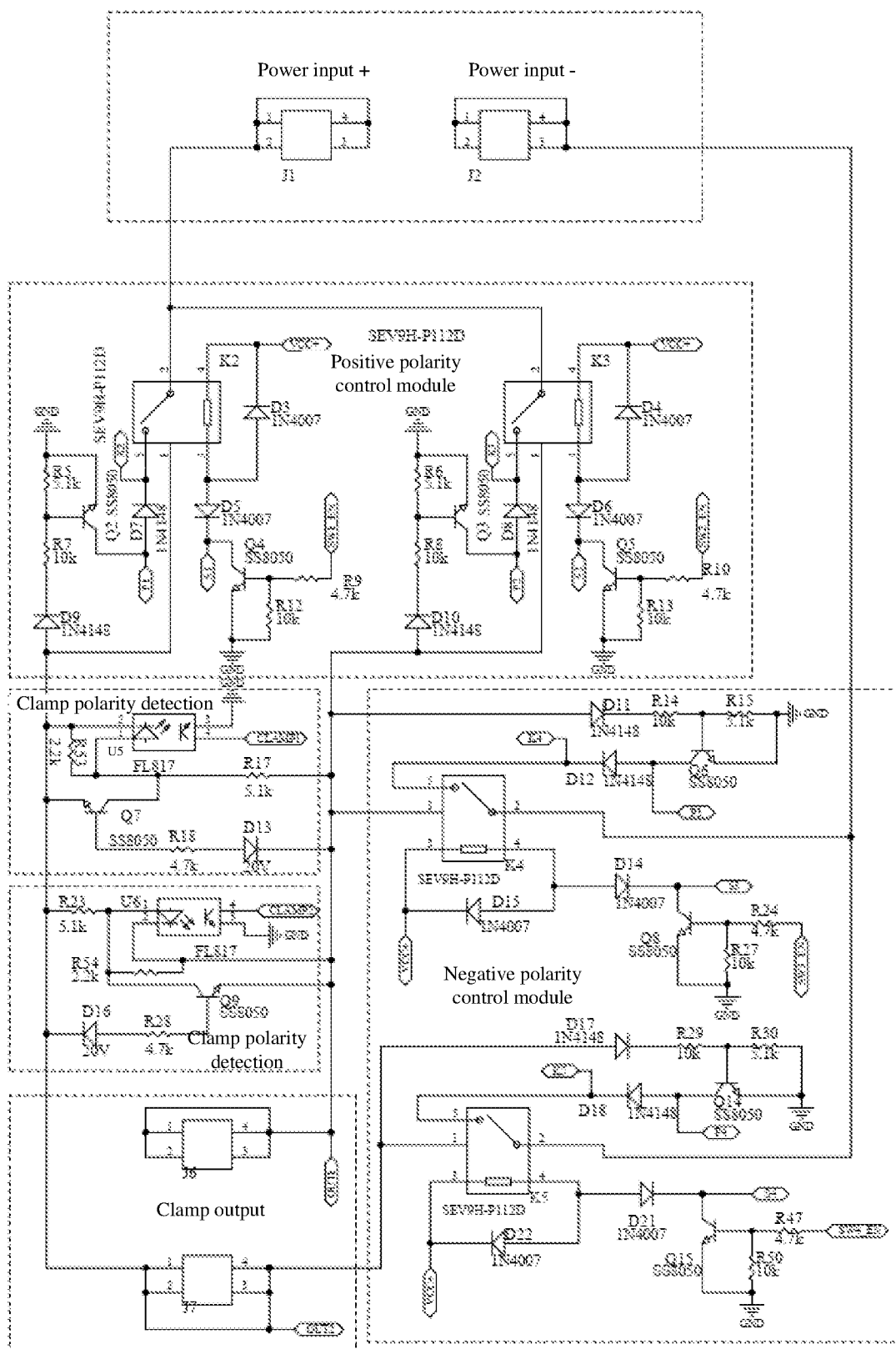
FIG. 5 is a schematic diagram showing structures and circuit configurations of a clamp polarity detection module, a clamp connection module and a relay detection module of a jumper cable device according to an embodiment of the present disclosure.

Please refer to FIG. 5, which is a schematic diagram showing structures and circuit configurations of a clamp polarity detection module, a clamp connection module and a relay detection module of a jumper cable device according to an embodiment of the present disclosure. The first electrode (e.g., positive electrode) control module 151 includes a first switch (e.g., relay, MOS or like) control module and a second switch (e.g., relay, MOS or like) control module, and the second electrode (e.g., negative electrode) control module 152 includes a third switch (e.g., relay, MOS or like) control module and a fourth switch (e.g., relay, MOS or like) control module. Each switch control module is connected to a different pin of the main controller 13 in a one-to-one manner. In one embodiment, when the switch detection module (specifically, the first clamp switch detection module 221) detects that the forced switch on the first clamp 11 has been pressed, the main controller 13 is configured to obtain the first feedback signal from the switch detection module, switch on (or enable) the second switch control module and the fourth switch control module, so to connect the first electrode of the power input to the first clamp 11 and connect the second electrode of the power input to the second clamp 12. When the switch detection module (specifically, the second clamp switch detection module 222) detects that the forced switch on the second clamp 12 has been pressed, the main controller 13 is configured to obtain the second feedback signal from the switch detection module, switch on (or enable) the first switch control module and the third switch control module, so to connect the first electrode of the power input to the second clamp 12 and connect the second electrode of the power input to the first clamp 11.

Specifically, please refer to FIG. 5, taking the relay switch as an example, the first switch control module includes a first relay switch K2, the second switch control module includes a second relay switch K3, the third switch control module includes a third relay switch K4, and the fourth switch control module includes a forth relay switch K5. Each switch control module further includes at least one resistor and one triode. In each switch control module, one end of a resistor (for example, R9, R10, R24, R47) is connected to a pin (7-10 pins) of the main controller 13, and the other end of the resistor is connected to the base of the triode (for example, Q4, Q5, Q8, Q15), the collector of the triode is connected to the third pin of the relay switch (K2~K5) and the emitter of the triode is connected to ground. The first clamp 11 is connected to the first pin of the second relay switch K3 and the first pin of the third relay switch K4, and the second clamp 12 is connected to the first pin of the first relay switch K2 and the first pin of the fourth relay switch K5. The first electrode of the power input is connected to the second pin of the first relay switch K2 and the second pin of the second relay switch K3, and the second electrode of the power input is connected to the second pin of the third relay switch K4 and the second pin of the fourth relay switch K5. In one embodiment, the first electrode of the power input is a positive electrode, and the second electrode of the power input is a negative electrode. In another embodiment, the first electrode of the power input is a negative electrode, and the second electrode of the power input is a positive electrode.

Taking the forced switch on the first clamp 11 being pressed as an example, the main controller 13 obtains the first feedback signal and controls the switch-on of the second switch control module and the fourth switch control module. At this time, the relay switches K2 and K4 are switched on and enabled, and the first pin and the second pin of this set of relay switches K2 and K4 are connected, thereby connecting the first electrode of the power input to the first clamp 11 (OUT1 in FIG. 5), and connecting the second electrode of the power input to the second clamp 12 (OUT2 in FIG. 5). OUT1 and OUT2 are respectively connected to the first clamp 11 and the second clamp 12 through EC5 copper pillars. The forced switch switches on the two clamps are connected to the key connection base of the cable plate J5 through the 3 pins in the middle of the EC5 seat.

Further, the jumper cable device further comprises a first display module 110 and a second display module 120. The first display module 110 is connected to the first clamp 11 and is configured to display the polarity of the battery to which the first clamp 11 is connected. The second display module 120 is connected to the second clamp 12 and is configured to display the polarity of the battery to which the second clamp 12 is connected. The first display module 110 and the second display module 120 do not need to be connected to the main controller. In actual operation, they are independent from the main controller, and can work independently on their own. For example, when the voltage of the battery of the load is not lower than the detection threshold, the first clamp 11 is connected to the positive electrode of the battery and the second clamp 12 is connected to the negative electrode of the battery, then the first display module 110 automatically displays a first signal and the second display module 120 automatically displays a second signal; when the second clamp 12 is connected to the positive electrode of the battery and the first clamp 11 is connected to the negative electrode of the battery, the second display module 120 automatically displays the first signal and the first display module 110 automatically displays the second signal.

The jumper cable device further includes a plurality of relay detection modules 19 which are configured to detect whether the relay switches K2-K5 are stuck or not. A stuck state of the relay switches refers to the failure of control of the relay switches, which means statues of the switches may not be changed successfully when being powered on or not. For example, compared to the statues of the relay switches when being energized, the statues of the relay switches when being not energized do not change. That is, the relay switch state is not switched.

Particularly, each of the relay detection modules 19 includes first and second diodes, a triode and first and second resistors. A positive electrode of the first diode is connected to a pin of the main controller 13 and a collector of the triode, and the negative electrode of the first diode is connected to a fifth pin of a relay switch to be detected. A base of the triode is connected to first ends of the two resistors. A second end of the first resistor is connected to the negative electrode of the second diode, and a positive electrode of the second diode is connected to a first pin of the relay switch.

When the pin 5 or 6 of the main controller 13 detects that the level signal is changed to a high-level signal, it is determined that the relay switch K4 or K5 to which the pin is connected is stuck. When the pin 3 or 4 of the main controller 13 detects that the level signal is changed to a low-level signal, it is determined that the relay switch K2 or K3 to which the pin is connected is stuck.

The jumper cable device further includes an alarm module 20 and an input voltage detection module 21.

The alarm module 20 is connected to the main controller 13 and the voltage stabilization module 18. The alarm module 20 includes a buzzer which is configured to perform a buzzer alarm according to an instruction from the main controller 13.

Figure 9:
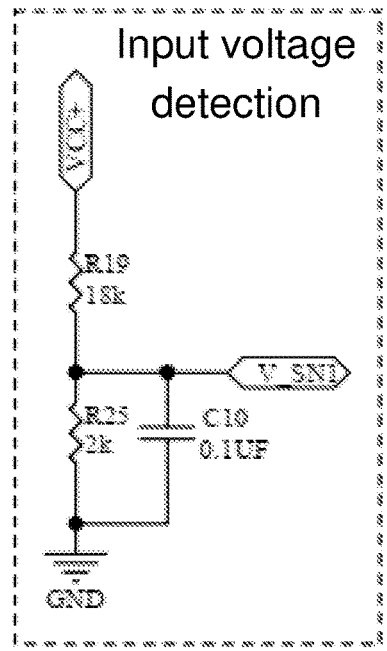
FIG. 9 is a schematic diagram showing a structure and a circuit configuration of the input voltage detection module of a jumper cable device according to an embodiment of the present invention.

The input voltage detection module 21 is connected to the main controller, as shown in FIG. 9. FIG. 9 is a schematic diagram showing a structure and a circuit configuration of an input voltage detection module 21 of a jumper cable device according to an embodiment of the present disclosure. It includes resistors R19, R25 and a capacitor C10. The main controller 13 detects the voltage of the startup power source at the input through the voltage division of R19 and R25. If the voltage of the input power source is too low, input low voltage protection is provided and the two clamps cannot be connected to the startup power source.

Figure 3:
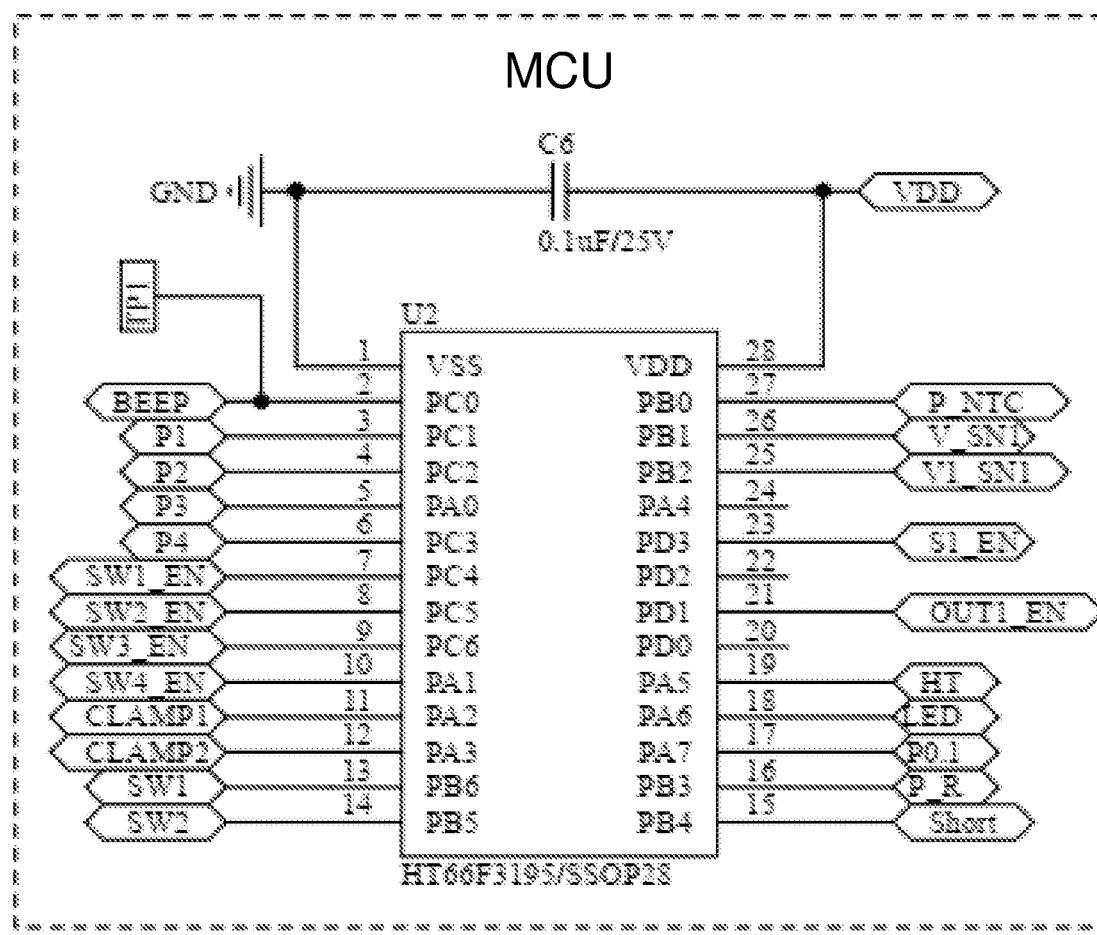
FIG. 3 is a schematic diagram showing a structure and a circuit configuration of a main controller of a jumper cable device according to an embodiment of the present disclosure.

Referring to FIG. 3, a structure and a circuit configuration of a connection relationship of the main controller of the jumper cable device is shown. The main controller includes a chip U2. A first pin of the chip U2 is connected to ground. A second pin of the chip U2 is connected to the alarm module 20. A third pin through a sixth pin of the chip U2 are respectively connected to the four relay detection modules 19. A seventh pin through a tenth pin of the chip U2 are respectively connected to the first through the fourth switch control modules. A eleventh pin and a twelfth pin of the chip U2 are respectively connected to the first clamp polarity detection module 141 and the second clamp polarity detection module 142. A thirteenth pin and a fourteenth pin of the chip U2 are respectively connected to the forced switch detection signal on the first clamp 11 and the forced switch detection signal on the second clamp 12. A fifteenth pin of the chip U2 is connected to a short circuit feedback signal. A sixteenth pin of the chip U2 is connected to the internal resistance detection signal. A seventeenth pin of the chip U2 is connected to the stuck state fault feedback signal. When any relay is detected to be stuck, the seventeenth pin of the chip U2 outputs a high level (5V) signal. A eighteenth pin of the chip U2 is connected to the switch-on feedback signal of the switch. When any set of relays is switched on or enabled, the eighteenth pin of the chip U2 outputs a high level (5V) signal. A nineteenth pin of the chip U2 is connected to the high temperature protection feedback signal. A twenty-first pin, a twenty-third pin, and a twenty-fifth pin of the chip U2 are respectively connected to different ports of the resistance detection module 17 (see FIG. 11 for details). A twenty-sixth pin of the chip U2 is connected to the input voltage detection module 21 (see FIG. 9 for details). A twenty-seventh pin of the chip U2 is connected to the high temperature detection module 16 (see FIG. 12 for details). A twenty-eighth pin of the chip U2 is connected to the positive electrode of the chip power supply VDD.

Figure 11:
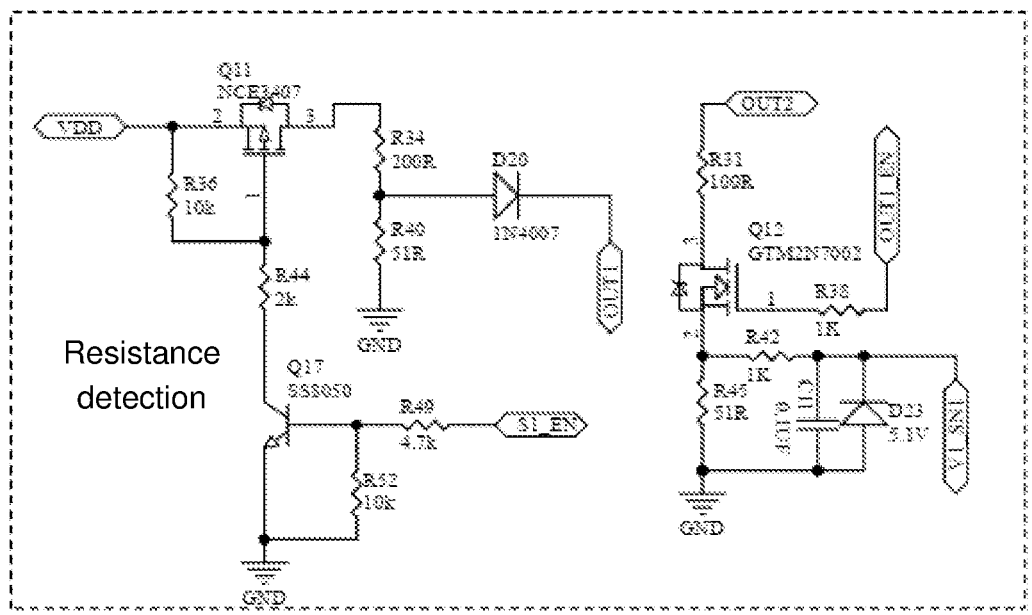
FIG. 11 is a schematic diagram showing a structure and a circuit configuration of the resistance detection module of a jumper cable device according to an embodiment of the present invention.

Further, please refer to FIG. 11, which is a schematic diagram showing a structure and a circuit configuration of a resistance detection module of a jumper cable device according to an embodiment of the present disclosure. The 15th pin of the main controller is connected to a short-circuit feedback signal "Short". The short-circuit detection method is that the 23rd pin S1_EN outputs a high level signal and the triode Q17 is switched on. At this time, the MOS tube Q11 is switched on, the OUT1 terminal outputs a voltage signal of 1V, and the 21st pin OUT1_EN outputs a high level signal. The MOS tube Q12 is then switched on, and when the voltage detected at the 25th pin V1_SN1 is >0.3V, it is determined to be a short circuit. At this time, the 15th pin outputs a high level signal of 5V. When the voltage detected at the 25th pin V1_SN1 is ≤0.3V, it is determined as internal resistance detection mode. That is, the two clamps have been clamped on a load battery which has an internal resistance. At this time, the 16th pin P_R outputs a high level signal of 5V. When it is detected that the two clamps are connected to the battery of the load, the internal resistance detection signal is output to the main controller so that the main controller generates a prompt message that a forced mode is required. The user could know according to the prompt message that the forced switch on one of the two clamps needs to be pressed, so the user experience can be further enhanced.

Figure 12:
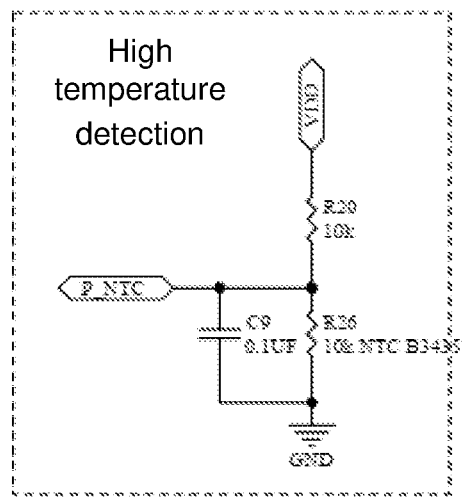
FIG. 12 is a schematic diagram showing a structure and a circuit configuration of the high temperature detection module of a jumper cable device according to an embodiment of the present invention.

Further, as shown in FIG. 12, which is a schematic diagram showing a structure and a circuit configuration of a high temperature detection module of a jumper cable device according to an embodiment of the present disclosure. The temperature detection module 16 comprises resistors R20 and R26 and a capacitor C9 and is configured to detect a temperature of a main body of the jumper cable device. The resistor R26 is a negative temperature coefficient thermistor. When the switch(es) temperature rises to 85° C., the 27th pin of the main controller chip U2 detects the voltage being≤0.63V and it determines as a high temperature protection mode. Then the switch(es) is switched off or disabled and the 19th pin of the main controller chip U2 outputs a high level signal of 5V. The input voltage detection module 21 is configured to detect an input voltage of the jumper cable device (that is, a voltage of the startup power source) and a real-time ignition voltage. The temperature detection module and the voltage detection module may be implemented by known means of the prior art, which will not be described in detail herein.

Figure 4:
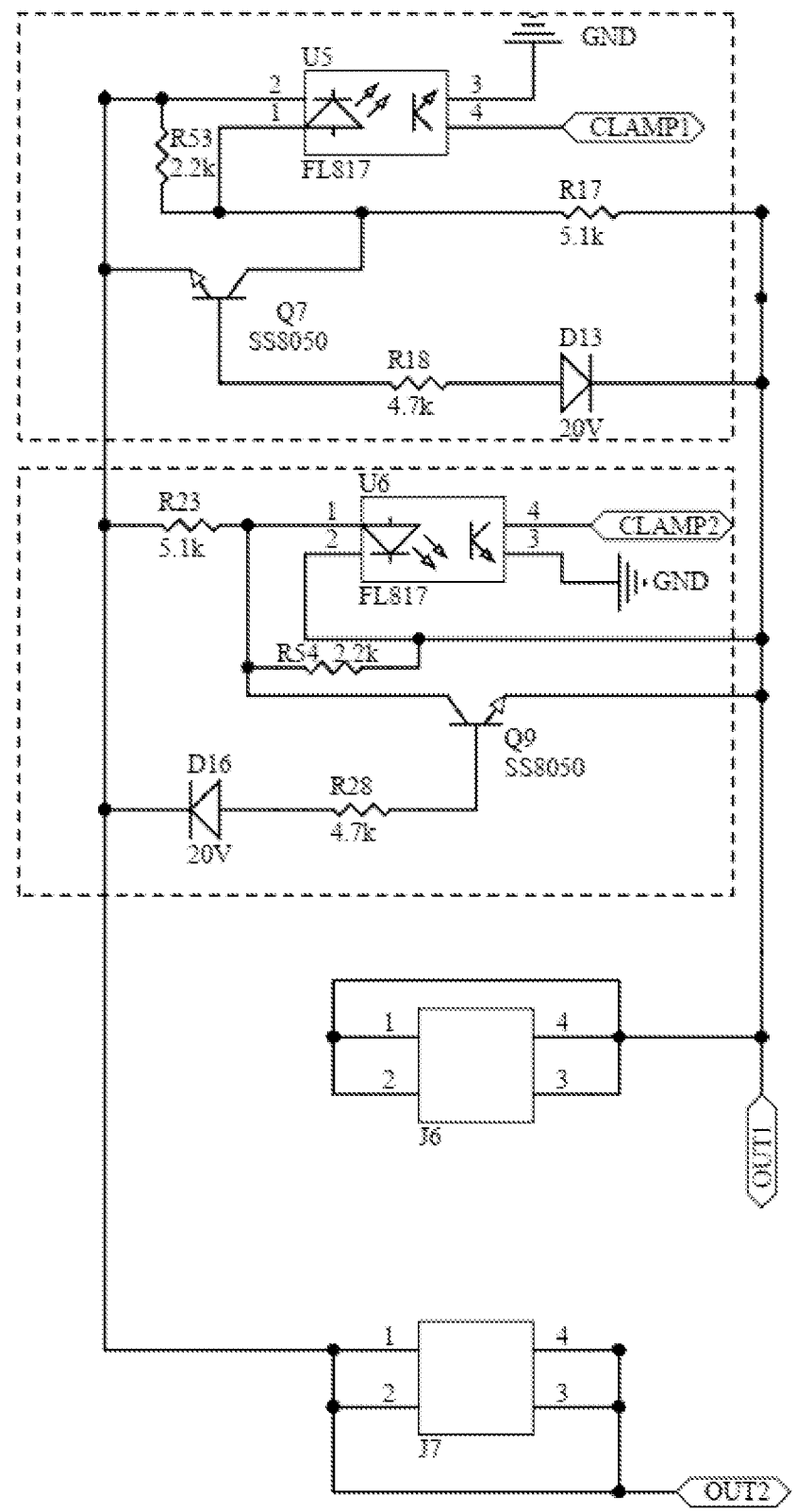
FIG. 4 is a schematic diagram showing a structure and a circuit configuration of a clamp polarity detection module of a jumper cable device according to an embodiment of the present disclosure.

Particularly, referring to FIG. 4, which is a schematic diagram showing a structure and a connection structure of the clamp polarity detection module 14, the clamp polarity detection module 14 includes a first clamp polarity detection module 141 and a second clamp polarity detection module 142. The first clamp polarity detection module and the second clamp polarity detection module are both connected to the main controller 13 and are respectively connected to the first clamp 11 and the second clamp 12. The first clamp polarity detection module includes a first optocoupler U5, a first resistor R17, and a second resistor R53, and the second clamp polarity detection module includes a second optocoupler U6, a third resistor R23, and a fourth resistor R54.

The first optocoupler U5 includes four pins, i.e., first to fourth pins. The first pin of the first optocoupler U5 is connected to one end of the first resistor R17, and the other end of the first resistor R17 is connected to the first clamp 11. The second pin of the first optocoupler U5 is connected to the second clamp 12. The third pin of the first optocoupler U5 is connected to ground. The fourth pin of the first optocoupler U5 is connected to the 11th pin of the main controller 13. Two ends of the second resistor R53 are respectively connected to the first pin and the second pin of the first optocoupler U5. The second optocoupler U6 also includes four pins, i.e., first to fourth pins. The first pin of the second optocoupler U6 is connected to one end of the third resistor R23, and the other end of the third resistor R23 is connected to the second clamp 12. The second pin of the second optocoupler U6 is connected to the first clamp 11. The third pin of the second optocoupler U6 is connected to the ground. The fourth pin of the second optocoupler U6 is connected to the 12th pin of the main controller. Two ends of the fourth resistor R54 are respectively connected to the first pin and the second pin of the second optocoupler U6.

In addition, a triode Q7, a resistor R18 and a diode D13 form an overvoltage protection circuit, and a transistor Q9, a resistor R28 and a diode D16 form an overvoltage protection circuit, in order to provide output high-voltage protection. For example, if the voltage of the load battery connected to the two clamps is greater than 20V, e.g., the voltage of the load battery is 24V, and then the overvoltage protection circuit can prevent the 24V voltage of the load battery from flowing back to the jumper cable device.

Identification of output polarities of the clamps: when the eleventh pin of the main controller chip detects that the CLAMP1 level signal of the first clamp polarity detection module is a low-level signal, it is determined that a first electrode of the battery is connected to the OUT1 and a second electrode of the battery is connected to the OUT2, e.g., the first clamp 11 is connected to the positive electrode of the battery and the second clamp 12 is connected to the negative electrode of the battery; and when the twelfth pin of the main controller chip detects that the CLAMP2 level signal of the second clamp polarity detection module is a low-level signal, it is determined that the first electrode of the battery is connected to the OUT2 and a second electrode of the battery is connected to the OUT1, e.g., the second clamp 12 is connected to the positive electrode of the battery and the first clamp 11 is connected to the negative electrode of the battery.

Figure 6:
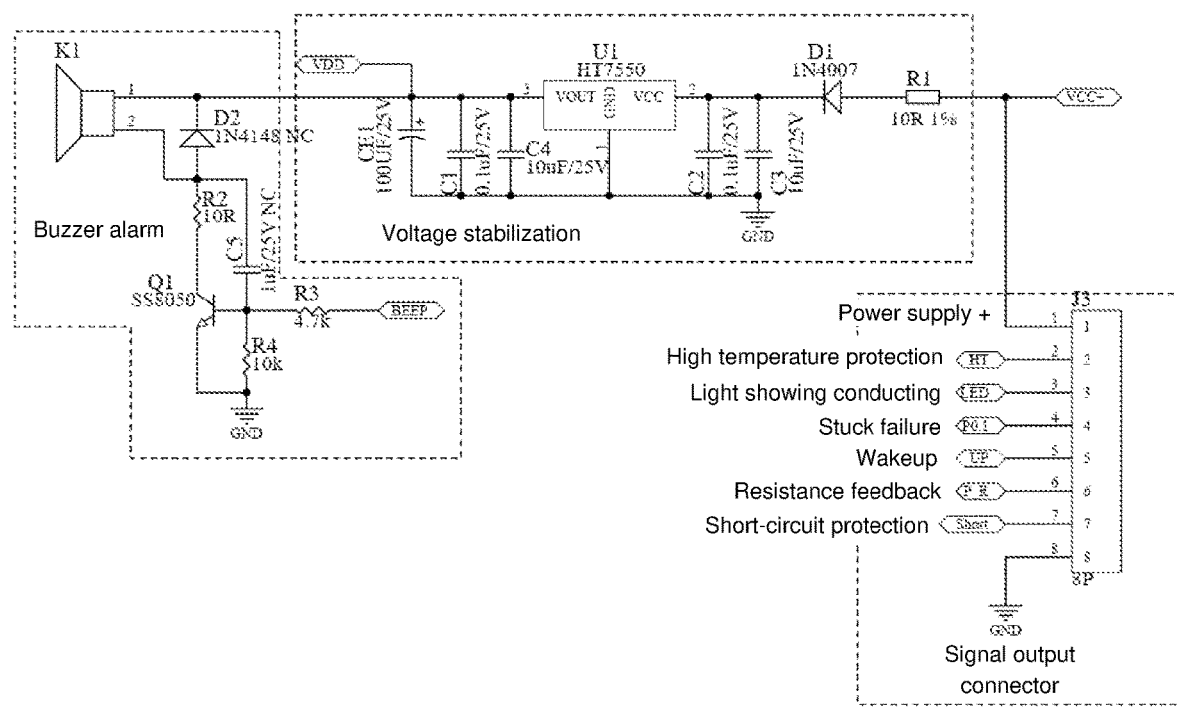
FIG. 6 is a schematic diagram showing structures and circuit configurations of a voltage stabilization module and an alarm module of a jumper cable device according to an embodiment of the present disclosure.

With reference to FIG. 5 and FIG. 6, FIG. 5 is a schematic diagram showing structures and circuit configurations of connection relationships of the clamp connection module and the relay detection module of the jumper cable device. FIG. 6 is a schematic diagram showing structures and circuit configurations of connection relationships of the voltage stabilization module 18 and the alarm module 20 of a jumper cable device. The voltage stabilization module 18 includes a voltage stabilization chip U1, capacitances CE1 and C1 to C4. The alarm module 20 includes a buzzer K1, resistors R2 to R4, and a triode Q1.

Referring to FIG. 5, the clamp connection module includes four switch control modules and four switches. The four switch control modules include a first switch control module, a second switch control module, a third switch control module and a fourth switch control module, which are respectively connected to the four switches and respectively connected to the seventh pin through the tenth pin of the main controller U2, that is, SW1_EN~SW4_EN as shown in the drawing. Taking FIG. 5 as an example, the four switches include a first relay switch K2, a second relay switch K3, a third relay switch K4 and a fourth relay switch K5. Each relay switch has 5 pins such as first to fifth pins as shown in FIG. 5.

Each of the switch control modules includes at least one resistor and one triode. One end of the resistor is connected to a pin of the main controller and the other end thereof is connected to a base of the triode. A collector of the triode is connected to a pin of the relay switch. An emitter of the triode is connected to ground.

Particularly, as shown in FIG. 5, the first switch control module at least includes a resistor R9 and a triode Q4, and further includes a resistor R12. One end of the resistor R9 is connected to a seventh pin of the main controller U2 and the other end thereof is connected to a base of the triode Q4. A collector of the triode Q4 is connected to a third pin of the first relay switch K2, that is, the pin 3 of the K2 in FIG. 5. The seventh pin SW1_EN of the main controller outputs a high level signal to control the triode Q4 so to drive the first relay switch K2. The eighth pin SW2_EN of the main controller outputs a high level signal to control the triode Q5 so to drive the second relay switch K3. The ninth pin SW3_EN of the main controller outputs a high level signal to control the triode Q8 so to drive the third relay switch K4. The tenth pin SW4_EN of the main controller outputs a high level signal to control the triode Q15 so to drive the fourth relay switch K5.

The structures and the connections of the second switch control module, the third switch control module and the fourth switch control module are similar to those of the first switch control module. Specific structures and connections are shown in FIG. 5 and will not be described in detail herein.

The first clamp 11 is connected to a first pin of the second relay switch K3 (i.e., the pin 1 of the K3) and a first pin of the third relay switch K4 (i.e., the pin 1 of the K4). The second clamp 12 is connected to a first pin of the first relay switch K2 (i.e., the pin 1 of the K2) and a first pin of the fourth relay switch K5 (i.e., the pin 1 of the K5).

Based on the detection results of the clamp polarity detection module or the feedback signal of the forced mode feedback module, the main controller controls the four switch control modules to control switching-on or switching-off of the four switches, so as to respectively connect the two electrode terminals to the two clamps and thus to the battery according to the polarities of the electrodes of the startup power source connected with the input and the polarities of the electrodes of the battery to which the two clamps are connected in such a manner that the electrode terminal and the clamp of the same polarity should be connected.

Particularly, a first case is described as below. When the main controller chip U2 detects a low-level signal at the eleventh pin, it can be determined that the first clamp 11 (OUT1) is connected to the first electrode of the battery. Then the main control chip controls the second switch control module and the fourth switch control module to respectively switch on the relay switches K3 and K5, such that the first electrode of the startup power source and the OUT1 are connected, and the second electrode of the startup power source and the OUT2 are connected.

A second case is described as below. When the main controller chip U2 detects a low-level signal at the twelfth pin, it can be determined that the second clamp 12 (OUT2) is connected to the first electrode of the battery. Then the main control chip controls the first switch control module and the third switch control module to respectively switch on the relay switches K2 and K4, such that the first electrode of the startup power source and the OUT2 are connected, and the second electrode of the startup power source and the OUT1 are connected.

A third case is described as below. When the switch detection module detects that the forced switch on the first clamp 11 has been pressed, the thirteenth pin of the main controller chip U2 obtains the first feedback signal of the switch detection module and controls the second switch control module and the fourth switch control module to respectively switch on the relay switches K3 and K5, such that the first electrode of the startup power source and the OUT1 are connected, and the second electrode of the startup power source and the OUT2 are connected. That is, the first electrode of the startup power source is connected to the first clamp 11, and the second electrode of the startup power source is connected to the second clamp 12.

A fourth case is described as below. When the switch detection module detects that the forced switch on the second clamp 12 has been pressed, the fourteenth pin of the main controller chip U2 obtains the second feedback signal of the switch detection module and controls the first switch control module and the third switch control module to respectively switch on the relay switches K2 and K4, such that the first electrode of the startup power source and the OUT2 are connected, and the second electrode of the startup power source and the OUT1 are connected. That is, the first electrode of the startup power source is connected to the second clamp 12, and the second electrode of the startup power source is connected to the first clamp 11.

In the above embodiments, preferably, the first electrode of the startup power source can be a positive electrode, and the second electrode of the startup power source can be a negative electrode. Alternatively, the first electrode of the startup power source can be a negative electrode, and the second electrode of the startup power source can be a positive electrode.

Further, the jumper cable device further includes four relay detection modules 19, i.e., P1 to P4 in FIG. 5, which are connected to a third pin through a sixth pin of the main controller chip U2, and configured to detect whether the four relay switches are stuck or not.

Each relay detection module includes two diodes, a triode and two resistors. A positive electrode of one diode is connected to a pin of the main controller and a collector of a triode, and a negative electrode of the diode is connected to a fifth pin of the relay switch to be detected. A base of the triode is connected to first ends of the two resistors. The second end of one of the resistors is connected to the negative electrode of the other diode. The second end of the other one of the resistors is connected to ground. A positive electrode of the other diode is connected to the first pin of the relay switch. The four relay detection modules include diodes D7 to D12, D17-D18, triodes Q2 to Q3, Q6, and Q14, and resistors R5-R8, R14-R15, and R29 to R30.

Particularly, the first relay detection module includes diodes D7 and D9, a triode Q2 and resistors R5 and R7. A negative electrode of the diode D7 is connected to the fifth pin of the first relay switch K2 (that is, the pin 5 of the K2), and the positive electrode of the diode D7 is connected to a collector of the triode Q2. A base of the triode Q2 is connected to first ends of the resistors R5 and R7. The second end of the resistor R7 is connected to the negative electrode of the diode D9, and the second end of the resistor R5 is grounded. A positive electrode of the diode D9 is connected to the first pin of the first relay switch K2 (i.e., the pin 1 of the K2).

The second relay detection module includes diodes D8 and D10, a triode Q3 and resistors R6 and R8, connection relationships of which are shown in FIG. 5, which are the same as those of the first relay detection module, and will not be repeated herein.

The third relay detection module includes diodes D11 and D12, a triode Q6 and resistors R14 and R15, connection relationships of which are shown in FIG. 5, which are the same as those of the first relay detection module, and will not be repeated herein.

The fourth relay detection module includes diodes D17 and D18, a triode Q14 and resistors R29 and R30, connection relationships of which are shown in FIG. 5, which are the same as those of the first relay detection module, and will not be repeated herein.

When the main controller detecting that the level signal at anyone of the two pins which are respectively connected to the first and second relay detection modules is changed to the low-level signal, it is determined that the corresponding relay switch connected thereto is stuck. When the main controller detecting that the level signal at anyone of the two pins which are respectively connected to the third and fourth relay detection modules is changed to the high-level signal, it is determined that the corresponding relay switch connected thereto is stuck.

By taking the first relay detection module and the first relay switch K2 as an example, when the first relay switch K2 is not powered, the second pin (i.e., the pin 2 of the K2 in FIG. 5) and the fifth pin (the fifth pin of the K2) are connected. However, by this time, if the second pin of the K2 (i.e., the pin 2 of the K2) and the first pin (i.e., the pin 1 of the K2) are connected, the first relay switch K2 does not disconnect, that is, the first relay switch K2 and the first pin are not disconnected, it is determined that the first relay switch K2 is stuck.

The alarm module 20 shown in FIG. 6 is connected to the main controller and the voltage stabilization module 18. The alarm module 20 includes a buzzer K1, which is connected to a second pin of the main controller chip U2, and configured to perform a buzzer alarm according to an instruction from the main controller.

Figure 7:
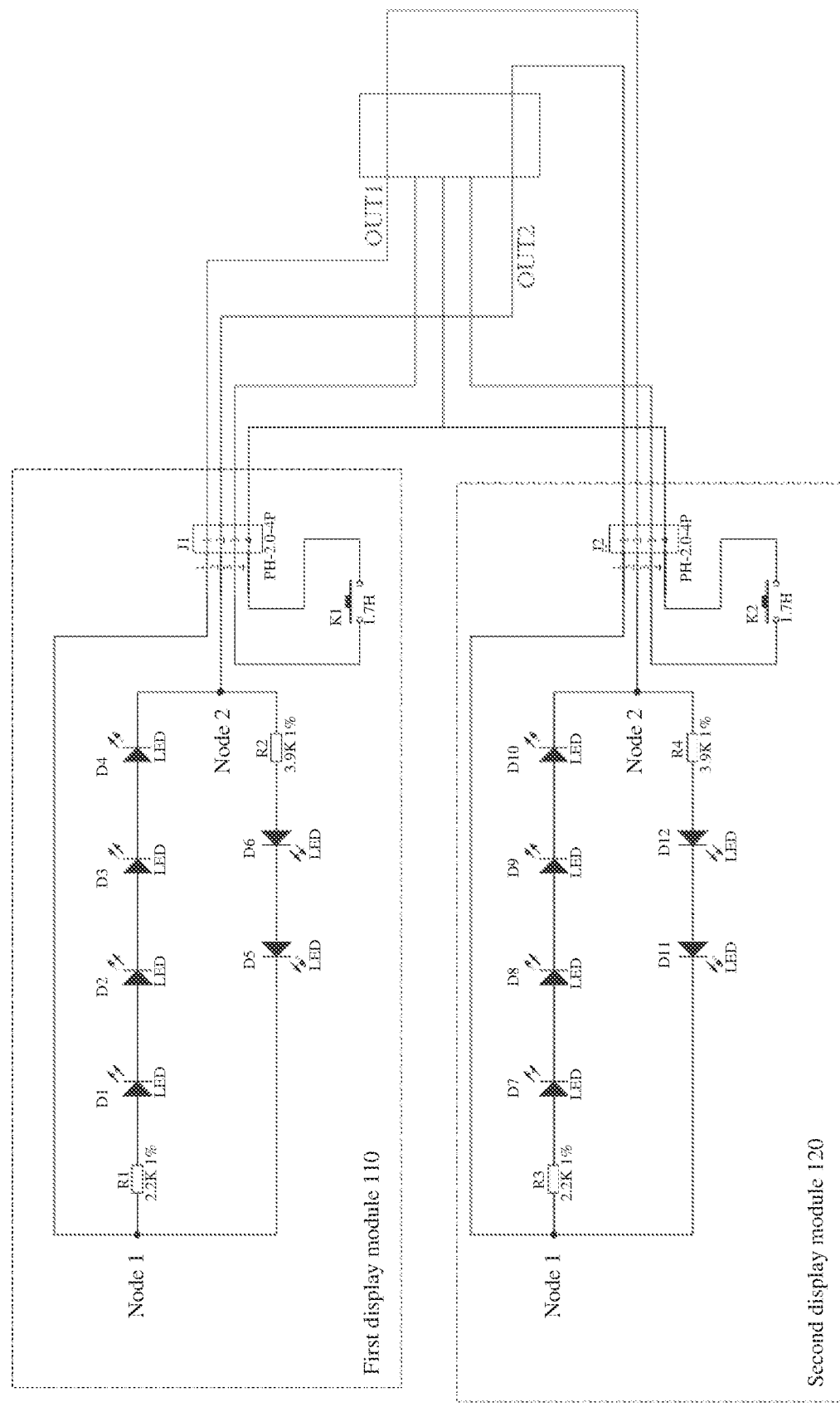
FIG. 7 is a schematic diagram showing a structure and a circuit configuration of a display module of a jumper cable device according to an embodiment of the present disclosure.

Referring to FIG. 7, a structure and a circuit configuration of a connection relationship of the display module of the jumper cable device is shown. The two display modules are provided on the two clamps, and the two display modules do not need to be connected to the main controller and can work independently. Each of the first display module 110 and the second display module 120 includes a forward diode group and a reverse diode group. In each display module, the forward diode group includes a first number of light-emitting diodes (LEDs) that are connected in forward series, and the reverse diode group includes a second number of light-emitting diodes that are connected in reverse series. The forward diode group and the reverse diode group in each display module are connected in parallel to a first node and a second node. The first node of the first display module 110 and the second node of the second display module 120 are connected to the first clamp 11, and the second node of the first display module 110 and the first node of the second display module 120 are connected to the second clamp 12. The second number may be smaller than the first number. Alternatively, the second number may be larger than the first number, or the second number may be the same as the first number.

Taking FIG. 7 as an example, the first display module 110 includes a first LED group D1~D4 and a second LED group D5~D6. The first LED group comprises four LEDs D1~D4 that are connected in forward series. The second LED group comprises two LEDs D5~D6 that are connected in reverse series. The second display module 120 includes a third LED group D7~D10 and a fourth LED group D11~D12. The third LED group comprises four LEDs D7~D10 that are connected in forward series. The fourth LED group comprises two LEDs D11~D12 that are connected in reverse series. Optionally, resistors R1~R4 are current limiting protection resistors. Among them, in the first display module 110, the first LED group D1~D4 and the second LED group D5~D6 are connected in parallel; the anode of diode D1 and the cathode of diode D5 are connected as a first node of the parallel circuit, and the cathode of diode D4 and the anode of diode D6 are connected as a second node of the parallel circuit. In the second display module 120, the third LED group D7~D10 and the fourth LED group D11~D12 are connected in parallel; the anode of diode D7 and the cathode of diode D11 are connected as a first node of the parallel circuit, and the cathode of diode D10 and the anode of diode D12 are connected as a second node of the parallel circuit. It should be noted that the connection here can be a direct connection between two components, or an indirect connection through other components. Further, the first node of the first display module 110 (i.e., the anode of the diode D1) and the second node of the second display module 120 (i.e., the cathode of the diode D10) are both connected to the first clamp 11 through the connection sockets J1 and J2. The second node of the first display module 110 (i.e., the cathode of the diode D4) and the first node of the second display module 120 (i.e., the anode of the diode D7) are both connected to the second clamp 12 through the connection sockets J1 and J2. In addition, the two forced switches are provided on the first clamp 11 and the second clamp 12 respectively.

When the voltage of the battery of the load is not lower than the detection threshold and the first clamp is connected to the positive electrode of the battery and the second clamp is connected to the negative electrode of the battery, the first display module 110 automatically displays the first signal and the second display module 120 automatically displays the second signal; and when the second clamp is connected to the positive electrode of the battery and the first clamp is connected to the negative electrode of the battery, the second display module 120 automatically displays the first signal and the first display module 110 automatically displays the second signal. If the voltage of the load battery is lower than the detection threshold, the forced mode function can be activated to connect the circuits between the input and the two clamps.

When the forced mode feedback module provides feedback signal to the main controller that the forced switch on the first clamp 11 has been pressed so the power input and the two clamps are forcibly connected, the first clamp 11 is determined as the first electrode and the second clamp 12 is determined as the second electrode. At this time, the first node of the first display module 110 is connected to the first electrode of the power input and the second node of the first display module 110 is connected to the second electrode of the power input to display a first signal, and the first node of the second display module 120 is connected to the second electrode of the power input and the second node of the second display module 120 is connected to the first electrode of the power input to display a second signal. Taking FIG. 7 as an example, if the first electrode is the positive electrode, the LEDs D1~D4 of the first display module 110 and the LEDs D11~D12 of the second display module 120 are all switched on and lightened, displaying the first signal and the second signal respectively.

When the forced mode feedback module provides feedback signal to the main controller that the forced switch on the second clamp 12 has been pressed so the power input and the two clamps are forcibly connected, the second clamp 12 is determined as the first electrode and the first clamp 11 is determined as the second electrode. At this time, the first node of the second display module 120 is connected to the first electrode of the power input and the second node of the second display module 120 is connected to the second electrode of the power input to display a first signal, and the first node of the first display module 110 is connected to the second electrode of the power input and the second node of the first display module 110 is connected to the first electrode of the power input to display a second signal. Taking FIG. 7 as an example, if the first electrode is the positive electrode, the LEDs D7~D10 of the second display module 120 and the LEDs D5~D6 of the first display module 110 are all switched on and lightened, displaying the first signal and the second signal respectively.

In one embodiment, the first signal above can be shown as "+" and the second signal above can be shown as "−".

In the embodiments of the present disclosure, the clamp polarity detection module and the clamp connection module are further connected to the two clamps. When the two clamps are connected to the battery, the clamp polarity detection module is configured to detect the polarities of the electrodes of the battery to which the two clamps are respectively connected. The main controller is configured to acquire a detection result signal of the clamp polarity detection module, to control the clamp connection module according to the detection result signal to determine the polarities of the two clamps according to the polarities of the electrodes of the battery, and to connect circuits from the startup power source to the battery. Since the polarities of the two clamps are automatically determined according to the polarities of the electrodes of the battery, there is no need to confirm whether the clamps have been connected to the electrodes of the battery with correct polarities, simplifying the connection and improving the reliability of the jumper cable device. When the voltage of the battery of the connected load is lower than the detection threshold, the forced mode feedback module is activated and operated to forcibly connect the path between the power input and the two clamps, thereby switching on the circuit to the battery. Even if the battery voltage is insufficient, the two clamps can still be randomly connected to two electrodes of the load battery. It can safely and effectively detects and controls the entire ignition process, and extends the service life of the jumper cable device.

Figure 8:
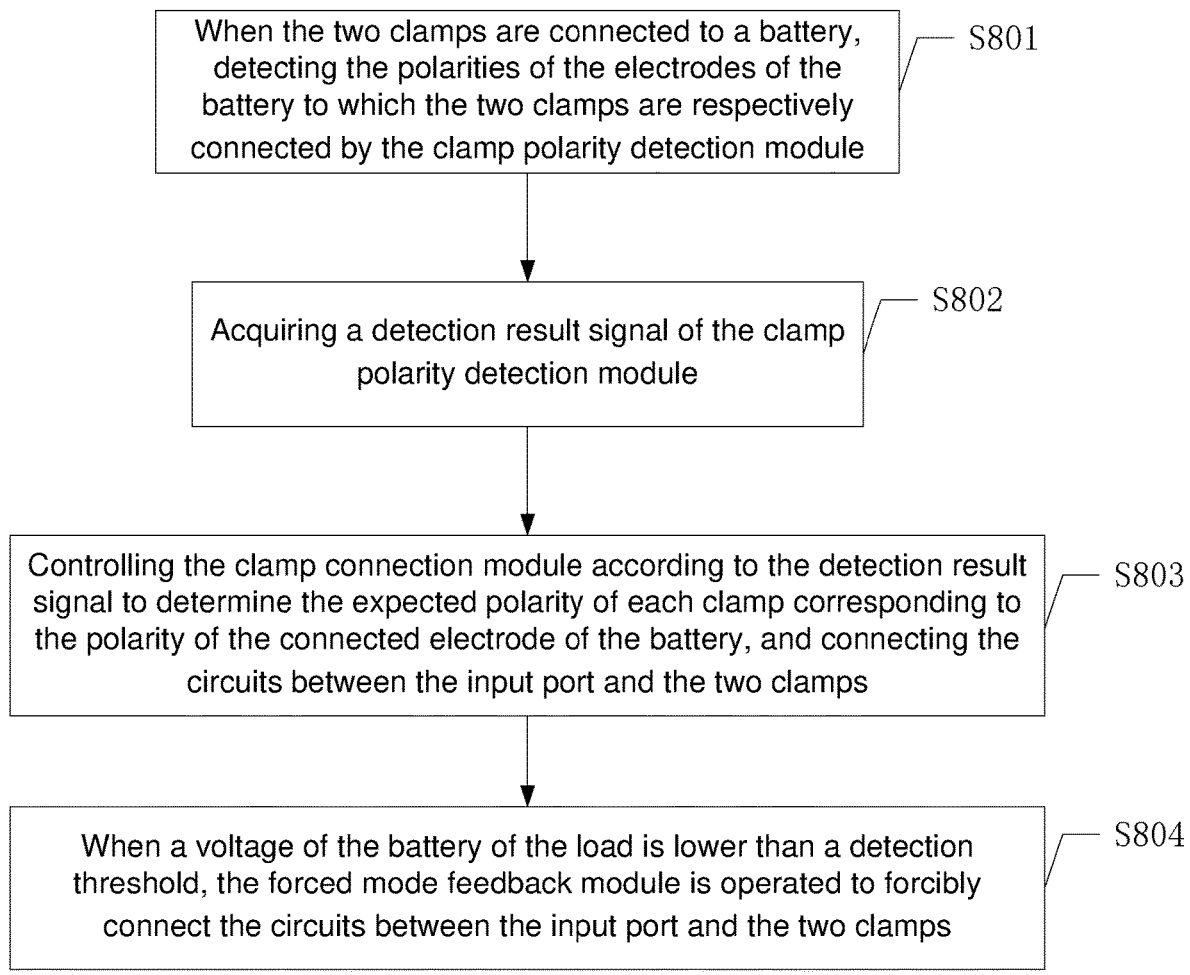
FIG. 8 is a flow chart of an ignition control method according to an embodiment of the present disclosure.

Referring to FIG. 8, it is a flowchart of a startup control method according to an embodiment of the present disclosure. The control method is performed by using the above-mentioned jumper cable device. The jumper cable device includes an input and two clamps, and further includes a main controller, a clamp polarity detection module, a forced mode feedback module and a clamp connection module. The main controller is connected to the clamp polarity detection module and the clamp connection module. The clamp polarity detection module and the clamp connection module are connected to the two clamps. The forced mode feedback module is connected to the main controller and the two clamps. For a specific structure, a connection, and a working principle, reference can be made to the descriptions of the foregoing embodiments.

As shown in FIG. 8, the control method is executed by a main control module. The method may be implemented by executing a specific computer program through the main control chip of the main control module. The method may include the following steps.

S801: when the two clamps are connected to a battery, detecting the polarities of the electrodes of the battery to which the two clamps are respectively connected by the clamp polarity detection module;

S802: acquiring a detection result signal of the clamp polarity detection module;

S803: controlling the clamp connection module according to the detection result signal to determine the expected polarity of each clamp corresponding to the polarity of the connected electrode of the battery, and connecting the circuits between the input and the two clamps, and thus the battery; and S804: when a voltage of the battery of the load is lower than a detection threshold, the forced mode feedback module is operated to forcibly connect the circuits between the input and the two clamps, thereby switching on a circuit to the battery, so to provide instantaneous large current to the battery.

For the details of the above steps, reference may be made to relevant descriptions of the foregoing embodiments, which will not be described in detail herein.

In the embodiments of the present disclosure, the jumper cable device is used to enable the ignition. When the two clamps are connected to the battery, the clamp polarity detection module detects the polarities of the electrodes of the battery to which the two clamps are respectively connected. The main controller acquires the detection result signal of the clamp polarity detection module, and controls the clamp connection module according to the detection result signal to determine polarity of each clamp according to the polarity of the connected electrode of the battery, and switches on circuits from the startup power source to the two clamps and the battery. Since the polarities of the two clamps are automatically determined corresponding to the polarities of the electrodes of the battery, there is no need to confirm in advance whether the clamps have been connected to the corresponding electrodes of the battery with correct polarities. By means of the jumper cable device of the present application, the two clamps may be connected to the battery according to the polarity of the electrodes of the battery, so that the successful ignition can be achieved, and the ignition success rate of the jumper cable is increased. Moreover, since there is no specific polarity requirement when connecting the clamps to the battery, risk of reverse connection is avoided, and thus the service life of the jumper cable device is prolonged. Even if the battery voltage is insufficient for the jumper cable device to detect the polarity of the electrodes of the battery to which the two clamps are connected, the two clamps can still be randomly connected to two electrodes of the load battery. The jumper cable device can still obtain the polarity of the electrodes of the battery connected to the two clamps, and by enabling the forced working mode function, the positive and negative polarities of the input startup power source are forcibly connected to the corresponding clamps, thereby switching on a circuit to the battery. It can safely and effectively detect and control the entire ignition process, and extends the service life of the jumper cable device.

Embodiments of the present disclosure further provide a jump start system, which includes a startup power source and a jumper cable device connected to the startup power source. The jumper cable device may be any one according to the embodiments described above. The startup power source is preferably a portable power source, such as a portable battery.

Figure 13:
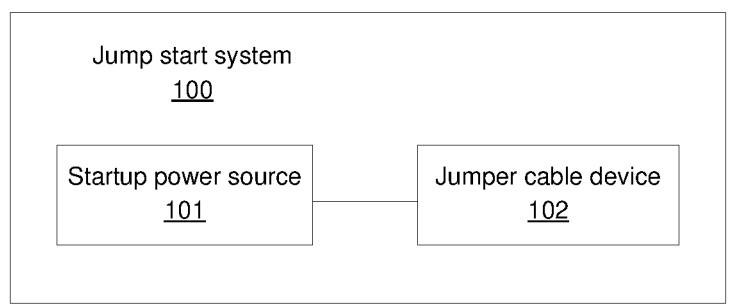
FIG. 13 is a schematic module diagram of a jump start system according to an embodiment of the present disclosure.

FIG. 13 is a schematic module diagram of a jump start system 100 provided according to an embodiment of the present invention. The jump start system 100 comprises a startup power source 101 and a jumper cable device 102, where the jumper cable device 102 can be the jumper cable device of any of the above embodiments. The startup power source 101 and the jumper cable device 102 can be of a split structure, that is, they are connected through an adapted male connector and a female connector. However, the startup power source 101 and the jumper cable device 102 can also be integrated as a whole, that is, the jump start system is an indivisible whole. Alternatively, the startup power source 101 and the circuit control part of the jumper cable device 102 are integrated into one body to form the main body part, and the clamp part is separately constructed with the main body part and is detachably connected to the main body part through an adapted male and female connector. For example, the smart jumper cable device comprises a housing, and the circuit control part like the main controller, the clamp polarity detection module and the clamp connection module are received in the housing.

Figure 14:
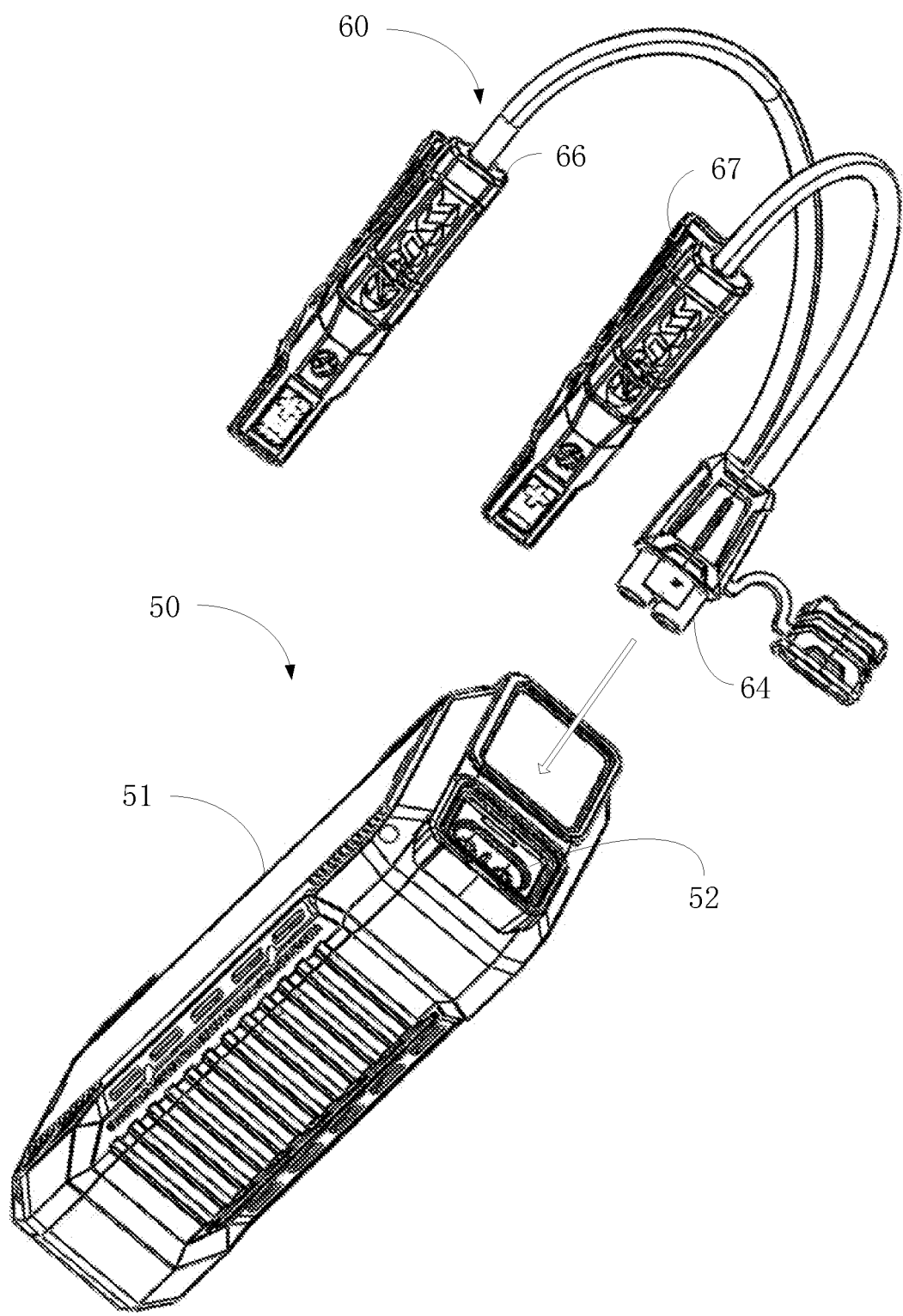
FIG. 14 is a perspective view showing a jump start system according to an embodiment of the present disclosure.

FIG. 14 is a perspective view of a jump start system according to an embodiment of the present invention. The jump start system comprises a main body part 50 and a clamp part 60. The main body part 50 comprises a startup power source and a control part of a jumper cable device. The clamp part 60 can be the clamp part of the above-mentioned jumper cable device. The clamp part 60 is connected to the main body part 50 through an adapted connector in an insertable manner, which will be described in details below.

Referring to FIGS. 14-17, specifically, the main body part 50 may comprise a housing 51 and a startup power source arranged inside the housing 51, as well as the main controller of the jumper cable device, the clamp polarity detection module, the clamp connection module, etc. The housing 51 is further provided with a first connector 52.

The clamp part 60 comprises a second connector 64, and a first clamp 66 and a second clamp 67 both connected to the second connector 64. The second connector 64 of the clamp part 60 can be connected to the first connector 52 of the main body part 50 in a pluggable manner and form an electrical connection.

Figure 16:
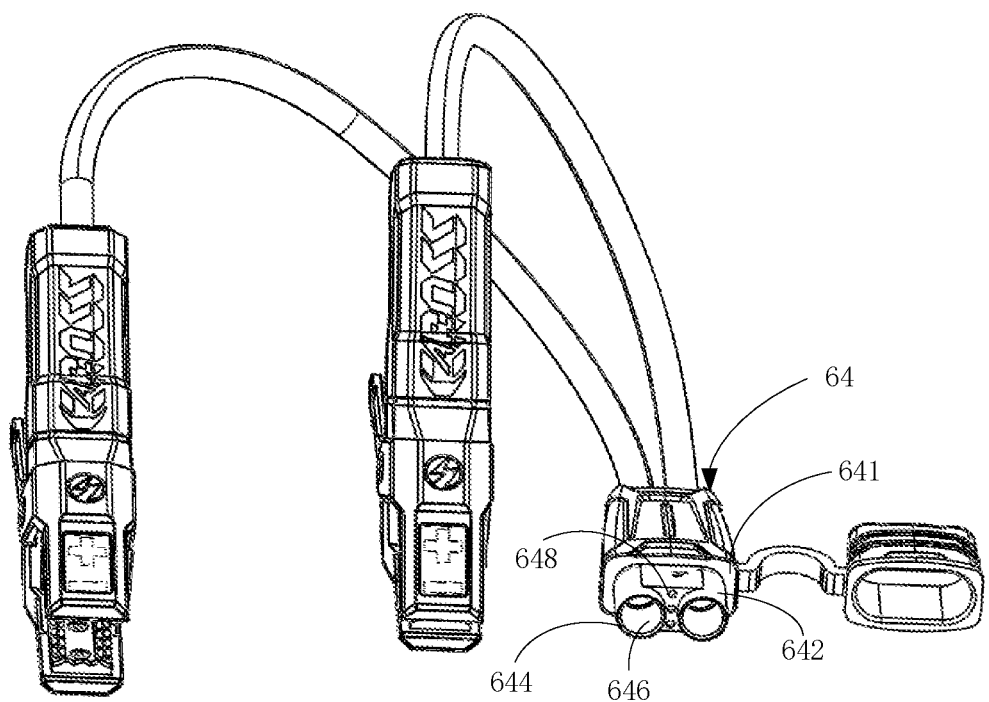
FIG. 16 is a perspective view from another angle showing the clamp part of the jump start system shown in FIG. 14.

As shown in FIG. 16, the second connector 64 of the clamp part 60 is configured as a plug, which comprises a first base 641, and the first base 641 forms an insertion portion 642. In this embodiment, two insertion portions 642 are provided, and the two insertion portions 642 are spaced apart from each other to form a first gap defined there between. The insertion portion 642 is in a cylindrical shape. Each insertion portion 642 is provided with a first insertion hole 644. The inner wall of each first insertion hole 644 is provided with a conductive terminal 646. In this embodiment, the conductive terminal 646 is in an annular shape. In addition, the second connector 64 further comprises a plurality of third terminals 648 disposed between the two insertion portions 642. In this embodiment, the second connector 64 comprises three third terminals 648, wherein two of the third terminals 648 are respectively connected to the forced switches on the two clamps, and the other third terminal 648 is connected to ground. The third terminals 648 are arranged in an annular shape, and the diameter of each third terminal 648 is smaller than the diameter of the conductive terminals 646. Specifically, three third terminals 648 are provided along a straight line in the first gap, and the straight line is perpendicular to the connecting line between the two conductive terminals 646.

Figure 17:
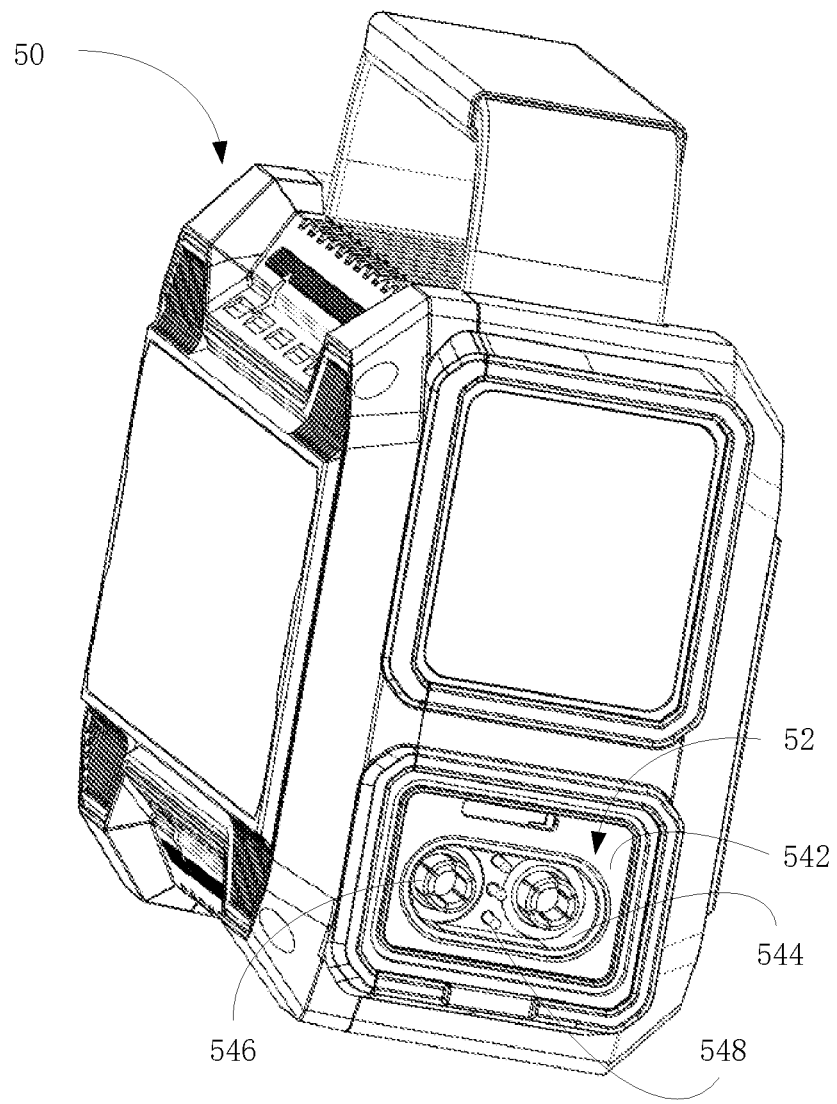
FIG. 17 is a perspective view showing the main body part of the jump start system shown in FIG. 14.

Correspondingly, as shown in FIG. 17, the first connector 52 of main body part 50 is configured as a socket, which comprises a second base 542, and the second base 542 forms a second jack 544. Two power terminals 546 and three fourth terminals 548 are provided in the second jack 544. The three fourth terminals 548 are connected to the main controller through the key connection base described in the above embodiment. The key connection base comprises three ports, which are connected to three fourth terminals 548 respectively. In this embodiment, there is only one second jack 544, and the power terminals 546 and the fourth terminals 548 are both in cylindrical shape. One of the two power terminals 546 is a positive terminal and the other is a negative terminal. The two power terminals 546 are spaced apart from each other to form a second gap defined there between, and the three fourth terminals 548 are provided in the second gap. The diameter of each fourth terminal 548 is smaller than the diameter of the power terminal 546. Specifically, three fourth terminals 548 are provided along a straight line in the second gap, and the straight line is perpendicular to the connecting line between the two power terminals 546.

For the first connector and the second connector, the three third terminals may be connected to the main controller through a key connection base. The key connection base comprises three ports, two of the three ports are respectively connected to the two of the third terminals that correspond to the two forced switches, and the other port is grounded.

As shown in FIGS. 16-17, the second connector 64 of the clamp part 60 of the present invention has a symmetrical structure on the outside. Correspondingly, the inside of the first connector 52 of the main body part 50 also has a symmetrical structure. Therefore, the second connector 64 of the clamp part 60 can be inserted into the first connector 52 of the main body part 50 in both a forward direction (first direction) and a reverse direction (second direction), and the two conductive terminals 646 of the clamp part 60 and the two power terminals 546 of the main body part 50 are electrically connected. That is the second connector 64 of the clamp part 60 can be inserted into the first connector 52 of the main body part 50 in the direction shown in the figure, or inserted into the first connector 52 of the main body part 50 in the opposite direction (i.e. the second connector 64 of the clamp part 60 is turned 180 degrees along the direction in the figure). In other words, there is no need to distinguish the insertion direction of the second connector 64 of the clamp part 60, and there is no polarity distinction between the two conductive terminals.

In this embodiment, the two insertion portions 642 of the second connector 64 of clamp part 60 are spaced apart. In other embodiments, the two insertion portions can also be connected into one body, that is, a whole insertion portion. Two first jacks are formed at interval inside the whole insertion portion, and three small holes are formed between the two jacks for arranging the three third terminals. When the insertion portion of the clamp part 60 is inserted into the second jack of the main body part 50, the two power terminals are respectively inserted into the two first jacks and come into contact with the corresponding conductive terminals to form an electrical connection.

In this embodiment, the second connector of the clamp part 50 is designed as a plug (male connector), and the first connector of the main body part 50 is designed as a socket (female connector). However, in other embodiments, the second connector of the clamp part 50 is designed as a socket (female connector), and the first connector of the main body part 50 is designed as a plug (male connector)

The second connector of the clamp part according to the embodiment of the present disclosure may be connected to the first connector of the main body part in both directions, which is convenient and quick, and a fool proof mechanism can be omitted.

With reference to FIGS. 14-16, the first clamp 66 and the second clamp 67 of the clamp part 60 are identical in shape and structure. The detailed descriptions will be provided by taking the first clamp 66 as an example.

As shown in FIG. 15, the first clamp 66 is of a clamp shape and includes two gripping portions 662 at its rear end and two clamping portions 664 at its front end. By manipulating the gripping portions 662, the two clamping portions 664 may be driven to open or close relatively, such that the first clamp 66 is able to be clamped on a battery of an vehicle. Tooth portions 666 are disposed on inner surfaces of the two clamping portions 664 facing each other. The tooth portions 666 extend along longitudinal directions of the clamping portions 664, with top ends being saw tooth-shaped. Due to the tooth portions 666, the clamp 66 can be connected to the vehicle battery firmly, thereby avoiding the disconnection caused by loosening due to vibration. In this embodiment, the first clamp 66 is provided with two sets of tooth portions 666 arranged in parallel therein, and the two sets of tooth portions 666 are spaced apart with a first distance therebetween. Each set of tooth portions 666 includes two rows of tooth portions 666 arranged in parallel. Two rows of tooth portions 666 in each set are arranged adjacently with a second distance defined therebetween. The second distance is smaller than the first distance. In this embodiment, each set of tooth portions 666 includes two rows of tooth portions 666, that is, four rows of tooth portions 666 are provided inside each of the clamping portions 664, and the four rows of tooth portions 666 of the one clamping portion 664 are opposite to the four rows of tooth portions 666 of the other clamping portion 664. Accordingly, the clamping stability of the clamps 66 may be enhanced, and the reliability of the clamp part 60 is improved. A forced switch 668 is provided on the front portion of the first clamp 66. After pressing the forced switch 668, the forced mode feedback module can provide a pressing feedback signal to the main controller, thereby the main controller may activate the forced mode function and forcibly switches on the circuits between the power input and the two clamps. In addition, a display screen 665 is provided on the clamping portion 664 of the first clamp 66, which can display whether the polarity of the battery of the load to which this clamp is connected is "+" or "−".

Regarding the shape and structure of the second clamp 67, reference can be made to the above descriptions of the first clamp, which will not be repeated herein.

It should be understood that the first clamp 66 and the second clamp 67 in this embodiment may be used as the first clamp 11 and the second clamp 12 according to any one of the above embodiments.

In the above-mentioned embodiments, the descriptions of various embodiment have their own emphasis. For elements that are not described in detail in a certain embodiment, reference may be made to related descriptions of other embodiments.

The foregoing is the description of the jumper cable device, the control method and the jump start system according to the present disclosure. Modifications may be made by those skilled in the art to the detailed implementations and the applications under the spirit of the embodiments of the present disclosure. In summary, the contents of the descriptions should not be construed as a limitation to the present disclosure.

The invention claimed is:

1. A jumper cable device, comprising an input and two clamps, wherein the input is configured to be connected with a startup power source, and the two clamps are configured to be connected to a battery of a load;

wherein the jumper cable device further comprises a main controller, a clamp polarity detection module, a forced mode feedback module and a clamp connection module;

wherein the main controller is connected to the clamp polarity detection module and the clamp connection module, the clamp polarity detection module and the clamp connection module are further connected to the two clamps, and the forced mode feedback module is connected to the main controller and the two clamps; and when the two clamps are connected to the battery, the clamp polarity detection module is configured to detect polarities of electrodes of the battery to which the two clamps are respectively connected, and the main controller is configured to acquire a detection result signal of the clamp polarity detection module, control the clamp connection module according to the detection result signal to determine polarities of the two clamps according to the polarities of the electrodes of the battery and connect circuits between the input and the two clamps to switch on a circuit to the battery;

wherein when a voltage of the battery of the load is lower than a detection threshold, the forced mode feedback module is operated to forcibly connect the circuits between the input and the two clamps, thereby switching on the circuit to the battery.

2. The jumper cable device according to claim 1, wherein the forced mode feedback module comprises two forced switches and a switch detection module, the two forced switches are respectively provided on the two clamps, the switch detection module is connected with the two forced switches and the main controller, and two electrodes of the battery include a first electrode and a second electrode;

when the two clamps are connected to the battery of the load and the voltage of the battery of the load is lower than the detection threshold, by pressing the forced switch on the clamp that is connected to the first electrode of the battery of the load, the circuits between the input and the two clamps are forcibly connected to switch on a circuit to the battery;

the switch detection module is configured to detect which one of the forced switches on the two clamps is pressed, the main controller is configured to obtain a feedback signal from the switch detection module, determine the polarities of the electrodes of the battery to which the two clamps are connected respectively based on the feedback signal, and determine the polarities of the two clamps according to the polarities of the electrodes of the battery, and control the clamp connection module to connect the circuits between the input and the two clamps, thereby switching on the circuit to the battery.

3. The jumper cable device according to claim 2, wherein the switch detection module comprises a first clamp switch detection module and a second clamp switch detection module, the first clamp switch detection module and the second clamp switch detection module are both connected to the main controller, and are respectively connected to the first clamp and the second clamp of the two clamps;

the first clamp switch detection module is configured to generate a first feedback signal to the main controller upon detecting that the forced switch on the first clamp is pressed, and the second clamp switch detection module is configured to generate a second feedback signal to the main controller upon detecting that the forced switch on the second clamp is pressed;

the main controller is also configured to determine that the first clamp is connected to the first electrode of the battery and the second clamp is connected to the second electrode of the battery according to the first feedback signal, or determine that the second clamp is connected to the first electrode of the battery and the first clamp is connected to the second electrode of the battery according to the second feedback signal.

4. The jumper cable device according to claim 2, wherein the clamp connection module comprises: a first electrode control module and a second electrode control module, the first electrode control module and the second electrode control module are both connected to the main controller and the two clamps, and are respectively connected to a first electrode and a second electrode of the input;

wherein, the first electrode control module includes a first switch control module and a second switch control module, the second electrode control module includes a third switch control module and a fourth switch control module, and each of the switch control modules is connected to different pins of the main controller in a one-to-one correspondence manner;

when the switch detection module detects that the forced switch on the first clamp is pressed, the main controller is configured to obtain the first feedback signal from the switch detection module, and control to switch on the second switch control module and the fourth switch control module to connect the first electrode of the input to the first clamp and connect the second electrode of the input to the second clamp;

when the switch detection module detects that the forced switch on the second clamp is pressed, the main controller is configured to obtain the second feedback signal from the switch detection module, and control to switch on the first switch control module and the third switch control module to connect the first electrode of the input to the second clamp and connect the second electrode of the input to the first clamp.

5. The jumper cable device according to claim 4, wherein the first switch control module comprises a first switch, the second switch control module comprises a second switch, the third switch control module comprises a third switch and the fourth switch control module comprises a fourth switch;

each of the switch control modules comprises at least one resistor and one triode;

wherein in each switch control module, one end of the resistor is connected to a pin of the main controller and an other end of the resistor is connected to a base of the triode, a collector of the triode is connected to a third pin of the switch and an emitter of the triode is connected to ground;

wherein the first clamp is connected to a first pin of the second switch and a first pin of the third switch; and wherein the second clamp is connected to a first pin of the first switch and a first pin of the fourth switch;

wherein the first electrode of the input is connected to a second pin of the first switch and a second pin of the second switch, and the second electrode of the input is connected to a second pin of the third switch and a second pin of the fourth switch.

6. The jumper cable device according to claim 1, further comprising an resistance detection module connected to the two clamps and the main controller, for detecting whether the two clamps are connected to the battery of the load, and when detecting that the two clamps are connected to the battery of the load, an internal resistance detection signal is output to the main controller to generate a prompt message that a forced mode is required.

7. The jumper cable device according to claim 1, further comprising:

a first display module connected to the first clamp, configured to display the polarity of the battery connected to the first clamp;

a second display module connected to the second clamp, configured to display the polarity of the battery connected to the second clamp;

wherein, when the voltage of the battery of the load is not lower than the detection threshold and the first clamp is connected to a positive electrode of the battery and the second clamp is connected to a negative electrode of the battery, the first display module displays a first signal and the second display module displays a second signal; when the second clamp is connected to the positive electrode of the battery and the first clamp is connected to the negative electrode of the battery, the second display module displays the first signal and the first display module displays the second signal.

8. The jumper cable device according to claim 7, wherein each of the first display module and the second display module comprises a forward diode group and a reverse diode group;
  in each display module, the forward diode group comprises a first number of light-emitting diode (LED) connected in forward series, and the reverse diode group comprises a second number of LED connected in reverse series; and the forward diode group and the reverse diode group are connected in parallel to a first node and a second node, the first node of the first display module and the second node of the second display module are connected to the first clamp, and the second node of the first display module and the first node of the second display module are connected to the second clamp.

9. The jumper cable device according to claim 8, wherein the second number is less than the first number.

10. The jumper cable device according to claim 8, wherein when the forced mode feedback module feeds back that the forced switch on the first clamp is pressed to forcibly connect the circuits between the input and the two clamps, the first node of the first display module is connected to the first electrode of the input and the second node of the first display module is connected to the second electrode of the input to display the first signal, and the first node of the second display module is connected to the second electrode of the input and the second node of the second display module is connected to the first electrode of the input to display the second signal;
  when the forced mode feedback module feeds back that the forced switch on the second clamp is pressed to forcibly connect the circuits between the input and the two clamps, the first node of the second display module is connected to the first electrode of the input and the second node of the second display module is connected to the second electrode of the input to display the first signal, and the first node of the first display module is connected to the second electrode of the input and the second node of the first display module is connected to the first electrode of the input to display the second signal.

11. The jumper cable device according to claim 7, wherein the first signal is "+", and the second signal is "−".

12. The jumper cable device according to claim 1, wherein the clamp polarity detection module comprises a first clamp polarity detection module and a second clamp polarity detection module both connected to the main controller,
  wherein the first clamp polarity detection module and the second clamp polarity detection module are respectively connected to a first one and a second one of the clamps;
  the clamp connection module comprises a first switch control module, a second switch control module, a third switch control module and a fourth switch control module, and each of the switch control modules is connected to different pins of the main controller in a one-to-one correspondence manner; and wherein the main controller is further configured to determine that the first clamp is connected to a first electrode of the battery and the second clamp is connected to a second electrode of the battery when the first clamp polarity detection module detects that a level signal is pulled down to a low-level signal, and switches on the second switch control module and the fourth switch control module to connect the first electrode of the input to the first clamp and connect the second electrode of the input to the second clamp;
  and the main controller is further configured to determine that the second clamp is connected to the first electrode of the battery and the first clamp is connected to the second electrode of the battery when the second clamp polarity detection module detects that a level signal is pulled down to a low-level signal, and switches on the first switch control module and the third switch control module to connect the first electrode of the input to the second clamp and connect the second electrode of the input to the first clamp.

13. The jumper cable device according to claim 12, wherein the first clamp polarity detection module comprises a first optocoupler, a first resistor and a second resistor, and the second clamp polarity detection module comprises a second optocoupler, a third resistor and a fourth resistor;
  wherein a first pin of the first optocoupler is connected to one end of the first resistor, an other end of the first resistor is connected to the first clamp, a second pin of the first optocoupler is connected to the second clamp, a third pin of the first optocoupler is grounded, and a fourth pin of the first optocoupler is connected to a pin of the main controller, two ends of the second resistor are respectively connected to the first pin and the second pin of the first optocoupler; and
  wherein a first pin of the second optocoupler is connected to one end of the third resistor, an other end of the third resistor is connected to the second clamp, a second pin of the second optocoupler is connected to the first clamp, a third pin of the second optocoupler is grounded, and a fourth pin of the second optocoupler is connected to a different pin of the main controller, two ends of the fourth resistor are respectively connected to the first pin and the second pin of the second optocoupler.

14. The jumper cable device according to claim 1, wherein the jumper cable device comprises a housing, and the main controller, the clamp polarity detection module and the clamp connection module are received in the housing;
  a first connector is provided on the housing, the two clamps are connected to a second connector, and the two clamps are connected to the housing by connecting the first connector and the second connector in an insertable manner; and
  both the first connector and the second connector comprises a first polarity terminal, a second polarity terminal and three third terminals, two of the three third terminals are respectively connected to the forced switches on the two clamps, and an other third terminal is grounded.

15. The jumper cable device according to claim 14, wherein in each of the first and second connectors, each third terminal has a diameter that is smaller than a diameter of the first polarity terminal and a diameter of the second polarity terminal.

16. The jumper cable device according to claim 14, wherein in each of the first connector and the second connector, the first polarity terminal and the second polarity terminal are spaced from each other with a gap defined there between, and the three third terminals are arranged along a straight line in the gap, wherein the straight line is perpendicular to a connecting line between the first polarity terminal and the second polarity terminal.

17. The jumper cable device according to claim 14, wherein the second connector is pluggable to the first connector in two directions.

18. The jumper cable device according to claim 14, wherein the three third terminals are connected to the main controller through a key connection base;
   wherein the key connection base comprises three ports, two of the three ports are respectively connected to the two of the third terminals that correspond to the two forced switches, and the other port is grounded.

19. A jump start system, comprising a startup power source and the jumper cable device according to claim 1.

20. The jump start system according to claim 19, wherein the jumper cable device comprises a housing, and the main controller, the clamp polarity detection module and the clamp connection module are received in the housing;
   a first connector is provided on the housing, the two clamps are connected to a second connector, and the two clamps are connected to the housing by connecting the first connector and the second connector in an insertable manner; and
   the startup power source is arranged inside the housing.

* * * * *